United States Patent
Hessler et al.

(10) Patent No.: US 10,958,393 B2
(45) Date of Patent: Mar. 23, 2021

(54) METHODS AND DEVICES FOR HANDLING AND ASSIGNING UPLINK PILOTS

(71) Applicant: Telefonaktiebolaget LM Ericsson (publ), Stockholm (SE)

(72) Inventors: Martin Hessler, Linköping (SE); Erik Eriksson, Linköping (SE); Eleftherios Karipidis, Stockholm (SE); Reza Moosavi, Linköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 61 days.

(21) Appl. No.: 15/543,486

(22) PCT Filed: Mar. 25, 2015

(86) PCT No.: PCT/SE2015/050360
§ 371 (c)(1),
(2) Date: Jul. 13, 2017

(87) PCT Pub. No.: WO2016/153405
PCT Pub. Date: Sep. 29, 2016

(65) Prior Publication Data
US 2017/0373807 A1    Dec. 28, 2017

(51) Int. Cl.
*H04L 5/00* (2006.01)
*H04L 25/03* (2006.01)
(Continued)

(52) U.S. Cl.
CPC ............ *H04L 5/005* (2013.01); *H04L 5/0035* (2013.01); *H04L 5/0091* (2013.01);
(Continued)

(58) Field of Classification Search
CPC ..... H04L 5/0057; H04L 5/0048; H04L 5/005; H04L 5/0051; H04L 5/0073; H04W 28/04;
(Continued)

(56) References Cited

U.S. PATENT DOCUMENTS 9,301,175 B2 *   3/2016   Nam et al. ........... H04B 7/0413
2011/0249597 A1  10/2011  Papadopoulos
(Continued)

FOREIGN PATENT DOCUMENTS

WO    2014208859 A1    12/2014

OTHER PUBLICATIONS

International Search Report and Written Opinion dated Nov. 20, 2015 for International Application Serial No. PCT/SE2015/050360, International Filing Date: Mar. 25, 2015 consisting of 9-pages.
(Continued)

*Primary Examiner* — Jae Y Lee
*Assistant Examiner* — Aixa A Guadalupe Cruz
(74) *Attorney, Agent, or Firm* — Patent Portfolio Builders, PLLC

(57) ABSTRACT

Disclosed are methods and devices for controlling radio base stations and User Equipments, UEs, in a wireless communication network. Corresponding computer programs are also provided. Embodiments provides mechanisms whereby it will be possible to determine whether an uplink pilot sequences has been contaminated. Further embodiments provides methods and devices for assigning a new uplink pilot sequence to a UE if the uplink pilot sequence assigned to the UE is deemed to be contaminated.

8 Claims, 21 Drawing Sheets

(51) Int. Cl.
*H04W 24/02* (2009.01)
*H04W 24/10* (2009.01)
*H04W 72/04* (2009.01)

(52) U.S. Cl.
CPC ....... *H04L 25/03331* (2013.01); *H04W 24/02* (2013.01); *H04W 24/10* (2013.01); *H04W 72/0446* (2013.01)

(58) Field of Classification Search
CPC ............... H04W 72/04; H04W 72/042; H04W 72/0446; H04W 72/0453; H04W 72/12
See application file for complete search history.

(56) References Cited

U.S. PATENT DOCUMENTS

| | | | |
|---|---|---|---|
| 2014/0126402 A1 | 5/2014 | Nam et al. | |
| 2014/0198655 A1* | 7/2014 | Ishii | H04W 28/08 370/235 |
| 2014/0233457 A1* | 8/2014 | Koutsimanis | H04L 5/0073 370/328 |
| 2014/0369300 A1* | 12/2014 | Hu | H04L 25/03318 370/329 |
| 2017/0104568 A1* | 4/2017 | Nasiri Khormuji | H04B 7/0413 |
| 2017/0207897 A1* | 7/2017 | Kim | H04W 24/10 |

OTHER PUBLICATIONS

Office Action issued in corresponding EP Application No. 15716183.7 dated Apr. 22, 2020, 04 Pages.

\* cited by examiner

METHODS AND DEVICES FOR HANDLING AND ASSIGNING UPLINK PILOTS

CROSS-REFERENCE TO RELATED APPLICATIONS

This application is a Submission Under 35 U.S.C. § 371 for U.S. National Stage Patent Application of International Application Number: PCT/SE2015/050360, filed Mar. 25, 2015 entitled "METHODS AND DEVICES FOR HANDLING AND ASSIGNING UPLINK PILOTS," the entirety of which is incorporated herein by reference.

TECHNICAL FIELD

The proposed technology generally relates to methods for controlling radio base stations, User Equipments and network nodes in a wireless communication network. More specifically the proposed technology provides methods and corresponding devices and computer programs that make it possible to determine whether uplink pilot sequences have been contaminated. The proposed technology also relates to methods, devices and computer programs for assigning new uplink pilot sequences in case of contamination.

BACKGROUND

Mobile data traffic is growing exponentially due to the enormous success of smart phones, tablets and other data traffic appliances. The traditional way for increasing the data rate has been to increase the transmission bandwidth. However, the spectrum has become scarce due to the increase in wireless access systems and hence the main challenge for the future wireless access systems is to find alternative solutions to meet high demands on the data rate. One way of handling the increased wireless data traffic is to deploy more radio base stations, RBS, and densify the cellular network. This would however lead to increased interference and higher deployment costs. Another, seemingly simpler option in terms of deployment cost, to increase the data rate is to introduce large antenna arrays at the RBS. The RBS, having excessive number of antennas, can simultaneously schedule multiple User Equipments, UEs, at the same time/frequency band with simple linear processing such as maximum-ratio transmission, MRT, or zero-forcing, ZF, in the downlink and maximum-ratio combining, MRC, or ZF in the uplink. This is often referred to as very large multi-user multiple-input-multiple-output, and is abbreviated by VL-MIMO hereafter. The biggest challenge in deploying VL-MIMO is how to acquire channel state information, CSI, which is essential to gain the potentials of the excessive amount of transmit antennas.

Traditionally, each UE, thanks to the pilot symbols transmitted during downlink phase, estimates the channel gain and feeds it back to the RBS via a reverse link. Since the number of required pilots in the downlink is proportional to the number of BS antennas, these schemes for obtaining CSI might require a fair amount of signaling overhead. The idea is therefore to operate in the time-division duplex, TDD, mode and rely on the channel reciprocity between the uplink and the downlink. More precisely, each UE transmits pilot symbols in the uplink phase which are then used by the RBS to estimate the channel. The amount of required pilots is thus proportional to the number of UEs which is typically much smaller than the number of base station antennas.

Having obtained a good estimate of the physical channel the base station is ready to manipulate the phase and amplitude in order to form beams. In order to form a correct beam, the transmitter, for example a radio base station, needs to be provided with the characteristics of the channel. This may be done by means of a process referred to as channel sounding or channel estimation. A known signal is sent from the radio base station to a UE. This signal makes it possible for the UE to obtain a rough estimate of the channel environment. The UE will then return the estimate of the channel characteristics to the transmitter. The transmitter may then apply phase and amplitude adjustments in order to form a beam directed at the UE. The signal used by the UE to return the estimate may be referred to as an uplink pilot or an uplink pilot sequence.

For a BS, or a radio base station, RBS, provided with a large number of antennas, e.g. a multi-user MIMO system, it is possible to perform such downlink channel estimations by utilizing different approaches such as frequency division duplex, FDD, or time division duplex, TDD.

In the FDD approach, for example, the RBS initiates the channel estimation procedure by transmitting a pilot sequence to all UEs served by the RBS. This will activate each UE and cause it to estimate its own channel to the RBS. Having performed the estimation the UEs forwards the estimated channel to the RBS. In common channel estimation procedures is it of importance that the pilot sequences are orthogonal.

In multi-cell scenarios containing C cells were each cell consists of a RBS with M antennas and N UEs it is hard to assign orthogonal pilot sequences since the number of symbols used in the pilot must be at least M×N symbols long. For a large number of UEs, that is, for N large, this is not a particularly feasible solution. Hence alternatives based on non-orthogonal pilot sequences have been developed. This approach, which re-uses particular uplink pilot sequences, may however lead to a problem referred to as pilot contamination. Pilot contamination occurs when channel estimates at a base station in a particular cell becomes affected by users in other cells. Pilot contamination negatively affects the channel estimation and also acts to degrade the downlink beamforming performance.

SUMMARY

It is an object to provide mechanisms that at least mitigate some of the drawbacks that emanates from pilot contamination. The proposed technology aims to provide mechanisms contaminated uplink pilot sequences can be singled out and replaced.

This and other objects are met by embodiments of the proposed technology.

According to a first aspect, there is provided a method for controlling radio base stations in a wireless communication network. The method comprises the step of determining a common uplink pilot sequence to be used by different User Equipment's, UEs, within the wireless communication network, each of the UEs being served by a separate radio base station. The method also comprises the step of providing information about the determined common uplink pilot sequence to at least a subset of the radio base stations in the wireless communication network in order to enable each radio base station in the subset of radio base stations to order a UE served by the radio base station to perform measurements on a downlink signal having a configuration that is based on the common uplink pilot sequence.

According to a second aspect there is provided a method for operating a radio base station in a wireless communication network. The method comprises the step of obtaining information about a common uplink pilot sequence used by several UEs within the network. The method also comprises the step of transmitting a measurement ordering message to a User Equipment, UE, served by the radio base station and assigned the common uplink sequence, the measurement ordering message comprising instructions ordering the UE to perform measurements on a downlink signal having a configuration that is based on the uplink pilot sequence assigned to the UE. The method also comprise the step of obtaining information relating to the performed measurement. The method also comprises the step of analyzing the obtained information to determine whether uplink pilot contamination has occurred.

According to a third aspect there is provided a method for operating a User Equipment, UE. The method comprises the step of receiving a measurement ordering message comprising instructions to perform measurements on a downlink signal having a configuration that is based on an uplink pilot sequence assigned to the UE. The method also comprises the step of performing measurements on the downlink signal. The method also comprises the step of conveying information about the measurements to a radio base station serving the UE to enable the radio base station to determine whether uplink pilot contamination has occurred.

According to a fourth aspect there is provided a method for operating a User Equipment, UE. The method comprises the step of performing measurements on a downlink signal. The method also comprises the step of determining whether the downlink signal have a signal configuration that has been generated based on an uplink pilot sequence being essentially the same as a uplink pilot sequence assigned to the UE. The method also comprises the step of conveying information about the measurements performed on the downlink signal determined to have the signal configuration to a radio base station serving the UE to enable the radio base station to determine whether uplink pilot contamination has occurred.

According to a fifth aspect there is provided a method for assigning an uplink pilot sequence to a UE in a wireless communication network. The method comprises the step of obtaining information about measurements performed by the UE on downlink signals that are based on an uplink pilot sequence essentially the same as the uplink pilot sequence assigned to the UE. The method also comprises the step of determining, based on the obtained information, whether uplink pilot contamination has occurred. The method also comprises the step of assigning a new uplink pilot sequence to the UE if it is determined that uplink pilot contamination has occurred.

According to a sixth aspect there is provided a network node configured for controlling radio base stations in a wireless communication network. The network node is configured to determine a common uplink pilot sequence to be used by different User Equipment's, UEs, within the wireless communication network, where each of the UEs is served by a separate radio base station. The network node is also configured to provide information about the determined common uplink pilot sequence to at least a subset of the radio base stations in the wireless communication network in order to enable each radio base station in the subset of radio base stations to order a UE served by the radio base station to perform measurements on a downlink signal having a configuration that is based on the common uplink pilot sequence.

According to a seventh aspect there is provided a radio base station in a wireless communication network. The radio base station is configured to obtain information about a common uplink pilot sequence used by several UEs within the network. The radio base 100 station is also configured to transmit a measurement ordering message to a User Equipment, UE, served by the radio base station and assigned the common uplink sequence, the measurement ordering message comprising instructions ordering the UE to perform measurements on a downlink signal having a configuration that is based on the uplink pilot sequence assigned to the UE. The radio base station is also configured to obtain information relating to the performed measurement. The radio base station is further configured to analyze the obtained information to determine whether uplink pilot contamination has occurred.

According to an eight aspect there is provided a User Equipment, UE. The UE is configured to receive a measurement ordering message comprising instructions to perform measurements on a downlink signal having a configuration that is based on an uplink pilot sequence assigned to the UE. The UE is also configured to perform measurements on the downlink signal. The UE is also configured to convey information about the measurements to a radio base station serving the UE to enable the radio base station to determine whether uplink pilot contamination has occurred.

According to a ninth aspect there is provided a User Equipment, UE. The UE is configured to perform measurements on downlink signals. The UE is also configured to determine whether the downlink signals have a signal configuration that has been generated based on an uplink pilot sequence being essentially the same as an uplink pilot sequence assigned to the UE. The UE is also configured to convey information about the measurements performed on the downlink signals determined to have the signal configuration to a radio base station serving the UE to enable the radio base station to determine whether uplink pilot contamination has occurred.

According to a tenth aspect there is provided a network node that is configured to assign an uplink pilot sequence to a UE in a wireless communication network. The network node is configured to obtain information about measurements performed by the UE on downlink signals that are based on an uplink pilot sequence essentially the same as the uplink pilot sequence assigned to the UE (10, 15). The network node is also configured to determine, based on the obtained information, whether uplink pilot contamination has occurred. The network node is further configured to assign a new uplink pilot sequence to the UE if it is determined that uplink pilot contamination has occurred.

According to an eleventh aspect there is provided a network node configured to control radio base stations in a wireless communication network. The network node comprises a determining module for determining a common uplink pilot sequence to be used by different User Equipment's, UEs, within the wireless communication network, each of the UEs being served by a separate radio base station. The network node also comprises a providing module for providing information about the determined common uplink pilot sequence to at least a subset of the radio base stations in the wireless communication network in order to enable each radio base station in the subset of radio base stations to order a UE served by the radio base station to perform measurements on a downlink signal having a configuration that is based on the common uplink pilot sequence.

According to a twelfth aspect there is provided a radio base station in a wireless communication network. The radio base station comprises an obtaining module for obtaining information about a common uplink pilot sequence used by several UEs within the network. The radio base station also comprises an output module for outputting a measurement ordering message to be transmitted to a User Equipment, UE, served by the radio base station and assigned the common uplink sequence, the measurement ordering message comprising instructions ordering the UE to perform measurements on a downlink signal having a configuration that is based on the uplink pilot sequence assigned to the UE. The radio base station also comprises a reading module for reading obtained information relating to the performed measurement. The radio base station further comprises an analyzing module for analyzing the obtained information to determine whether uplink pilot contamination has occurred.

According to a thirteenth aspect there is provided a User Equipment, UE. The UE comprises a reading module for reading a measurement ordering message comprising instructions to perform measurements on a downlink signal having a configuration that is based on an uplink pilot sequence assigned to the UE. The UE also comprises a storing module for storing information about measurements performed on the downlink signal. The UE further comprises an output module for outputting information about the measurements to be conveyed to a radio base station serving the UE to enable the radio base station to determine whether uplink pilot contamination has occurred.

According to a fourteenth aspect there is provided a User Equipment, UE. The UE comprises a storing module for storing information about measurements on performed on downlink signals. The UE also comprises a determining module (535) for determining whether the downlink signals have a signal configuration that has been generated based on an uplink pilot sequence being essentially the same as an uplink pilot sequence assigned to the UE. The UE further comprises an output module for outputting information about measurements performed on the downlink signals determined to have the signal configuration to be conveyed to a radio base station serving the UE to enable the radio base station to determine whether uplink pilot contamination has occurred.

According to a fifteenth aspect there is provided a network node that is configured to assign an uplink pilot sequence to a User Equipment, UE, in a wireless communication network. The network node comprises a reading module for reading information obtained from the UE about measurements performed on downlink signals that are based on an uplink pilot sequence essentially the same as the uplink pilot sequence assigned to the UE. The network node also comprises a determining module for determining, based on the obtained information, whether uplink pilot contamination has occurred. The network node further comprises an assigning module for assigning a new uplink pilot sequence to the UE if it is determined that uplink pilot contamination has occurred.

According to a sixteenth aspect there is provided a computer program that comprises instructions, which when executed by at least one processor, cause the processor(s) to:
  determine a common uplink pilot sequence to be used by different User Equipment's, UEs, within a wireless communication network, each of the UEs being served by a separate radio base station;
  output information about the determined common uplink pilot sequence to enable at least a subset of the radio base stations in the wireless communication network to obtain the information in order for the radio base stations to be able to order a UE served by the radio base station to perform measurements on a downlink signal having a configuration that is based on the common uplink pilot sequence.

According to a seventeenth aspect there is provided a computer program that comprises instructions, which when executed by at least one processor, cause the processor(s) to:
  read information about a common uplink pilot sequence used by several UEs within the network;
  trigger a transmission of a measurement ordering message to a User Equipment, UE, assigned the common uplink sequence, the measurement ordering message comprising instructions ordering the UE to perform measurements on a downlink signal having a configuration that is based on the uplink pilot sequence assigned to the UE;
  read obtained information relating to the performed measurement,
  process the obtained information in order to determine whether uplink pilot contamination has occurred.

According to an eighteenth aspect there is provided a computer program that comprises instructions, which when executed by at least one processor, cause the processor(s) to:
  read information in a measurement ordering message comprising instructions to perform measurements on a downlink signal having a configuration that is based on an uplink pilot sequence;
  trigger measurements to be performed on the downlink signal; and
  output information about the performed measurements to enable the information to be transmitted to a radio base station enable the radio base station to determine whether uplink pilot contamination has occurred.

According to a nineteenth aspect there is provided a computer program that comprises instructions, which when executed by at least one processor, cause the processor(s) to:
  trigger measurements to be performed on a downlink signal;
  read the output from the performed measurements;
  process the output of the performed measurements in order to determine whether the downlink signal have a signal configuration generated based on a specific uplink pilot sequence;
  output information about the measurements performed on the downlink signals that have been determined to have the signal configuration to enable the information to be conveyed to a radio base station to thereby enable the radio base station to determine whether uplink pilot contamination has occurred.

According to a twentieth aspect there is provided a computer program that comprises instructions, which when executed by at least one processor, cause the processor(s) to:
  read information about measurements performed by a User Equipment, UE, on downlink signals that are based on an uplink pilot sequence essentially the same as the uplink pilot sequence assigned to the UE;
  determine, based on the obtained information, whether uplink pilot contamination has occurred;
  assign a new uplink pilot sequence to the UE if it is determined that uplink pilot contamination has occurred.

Still another aspect relates to a computer-program product comprising a computer-readable medium having stored thereon a computer program according to any of the aspects sixteen, seventeen, eighteen, nineteen or twenty.

Advantages of the technology are that it provides mechanisms through which it will be possible to determine whether uplink pilot contamination has occurred. This will in turn enable the assignment of new uplink pilot sequences to replace the contaminated ones. This fact will in turn provide for a more efficient use of non-orthogonal uplink pilots and hence to a better use of the provided resources for radio base stations having multiple antennas. In particular for radio base stations adapted to work in 5G systems that utilizes VL-MIMO.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Figure 1A:
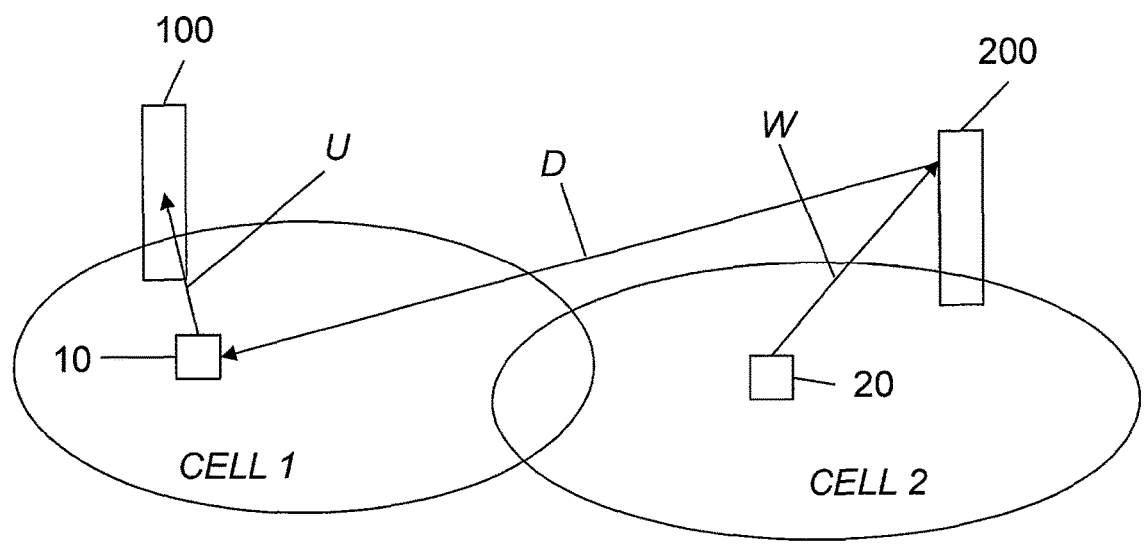
FIG. 1a is a schematic illustration of a network comprising two cells with corresponding radio base stations and user equipments, UEs. The signaling between the entities are also illustrated schematically.

Throughout the drawings, the same reference designations are used for similar or corresponding elements.

For a better understanding of the proposed technology, it may be useful to begin with a brief overview of the technology. In particular a brief overview of how the cooperation between radio base stations and User Equipment's, UEs, to obtain quality estimates of the physical channels between them can lead to pilot contamination.

The fundamental problem with pilot contamination may be explained with the help of a simple multi-cell scenario as the one depicted in FIG. 1. Consider two cells, cell 1 and cell 2 where each cell consists of one radio base station 100 and 200, respectively, and one user equipment 10, 20.

Let $U_{22}$ denote the channel between the radio base station 200 in cell 2 and the user equipment 20 in cell 2. The channel estimate of $U_{22}$ at the base station 200 in cell 2 may schematically be written as $U^*_{22}=AU_{12}+BU_{22}+0$, where A and B are some constants, O denotes additional noise and $U_{12}$ denotes the channel between radio base station 200 in cell 2 and user equipment 10 in cell 1. Since the estimate $U^*_{22}$ is used to form a pre-coding vector to be used for downlink signals the estimate should optimally only contain $U_{22}$. In the present case however the estimate also contain a component $U_{12}$, hence the pre-coding will be affected by the channel between radio base station 200 and the UE 10. This constitutes a simple example of what is more generally referred to as pilot contamination.

As has been described above, one straightforward way of solving the issues of pilot contamination is to use orthogonal uplink pilot assignments, such as Sounding Reference Signal assignments, SRS assignments, for all UEs or at least for the UEs in the neighboring cells. This may however be a too conservative approach since it requires the use of many orthogonal pilot sequences. This is because orthogonal SRS will be assigned to UEs even in the case when the crosstalk channels are very weak and the danger of contamination is low. The proposed technology provides other mechanisms that can be exploited to obtain an alternative solution to the problem.

We begin by giving a broad description of the proposed technology where emphasis is put on the proposed cooperation between the various nodes. This cooperation will enable the nodes to determine whether an uplink pilot sequence has been contaminated. Particular embodiments and specific alternatives of the various methods and network nodes cooperating will be provided in separate sections.

In what follows particular embodiments will be described where measurements are intended to be performed on particular resources. We therefore provide a short overview of what these resources may refer to. More detailed information will be provided at relevant places.

A general time-frequency grid, which specifies particular time slots and frequencies may include an individual radio channel as well as multiple radio channels, where each of the multiple radio channels in turn may include different subsets of the radio resource elements. Hence a UE may be ordered to perform measurements on a particular signal quality parameter for a specified subset of the radio resource elements in such a time-frequency grid.

So in particular examples to be described a measurement ordering message may comprise a signal measurement configuration that is provided to the UE. This configuration may have been conveyed to the UE in the form of an information element that specifies one or several points in the time-frequency grid or even a particular subset of the time-frequency grid.

A UE may therefore be ordered to perform measurements of, for example, a signal parameter in a specified radio resource elements in the time-frequency and report the outcome of the measurement back to the radio base station. It should be noted that the information on which resources the UE is intended to perform measurements on can be provided to the UE in different ways. One way is that the SRS-entity provides the resources, or equivalently specifies the downlink signal, to the radio base station that provides it to the UE in the form of information comprised in the measurement ordering message. Another way is that the radio base station derives the resources to be measured on based on the uplink pilot sequence used and provides the information to the UE in the form of information comprised in the measurement ordering message. Still another possible version is that the UE itself derive the resources based on the uplink pilot sequence that is assigned to the UE In a first possible example an overarching structure reference is made to FIG. 1a. FIG. 1a provides a schematic illustration of a wireless communication network. Two different cells are shown, where each cell comprises a radio base station 100, 200. The different radio base stations in turn serve a number of User Equipments, UEs, located in the corresponding cell. During a channel estimation procedure, a particular UE 10 transmits an uplink pilot sequence, denoted U, to its serving radio base station, e.g. radio base station 100. The radio base station 100 is now ready to pre-code a downlink pilot based on the received uplink pilot sequence. Now, if a UE 20 served by radio base station 200 also has transmitted an uplink pilot sequence, denoted W, to its serving radio base station, this triggers the radio base station 200 to pre-code a downlink signal based on the received uplink pilot sequence W. In the case the signals U and W are identical or essentially identical this may lead to the problem of pilot contamination. To enable a radio base station, for example the radio base station 100, to determine whether the uplink pilot sequence has been contaminated the proposed technology suggests the following procedure.

Upon receiving the uplink pilot sequence, radio base station 100 transmits a measurement ordering message, MOM, to the UE 10 that is assigned the uplink pilot sequence. The MOM orders the UE 10 to perform measurements on downlink signals that have been pre-coded to have a configuration that is based on the assigned uplink pilot sequence of the UE 10. On receiving the MOM the UE 10 begins performing measurements on detected downlink signals and reports the results back to the radio base station. The UE will in particular measure on specific measurement resources that can be derived from the assigned uplink pilot signal. Moreover, since the UE may detect downlink signals that have emanated from the radio base station 200, located in the other cell, a measurement on a downlink signal in the specified resource provides an indication that the uplink pilot has been contaminated. Hence, if the UE provides a measurement report that includes information that a downlink signal was detected in the specified resource, the radio base station is able to determine that the uplink pilot sequence was contaminated.

Figure 1B:
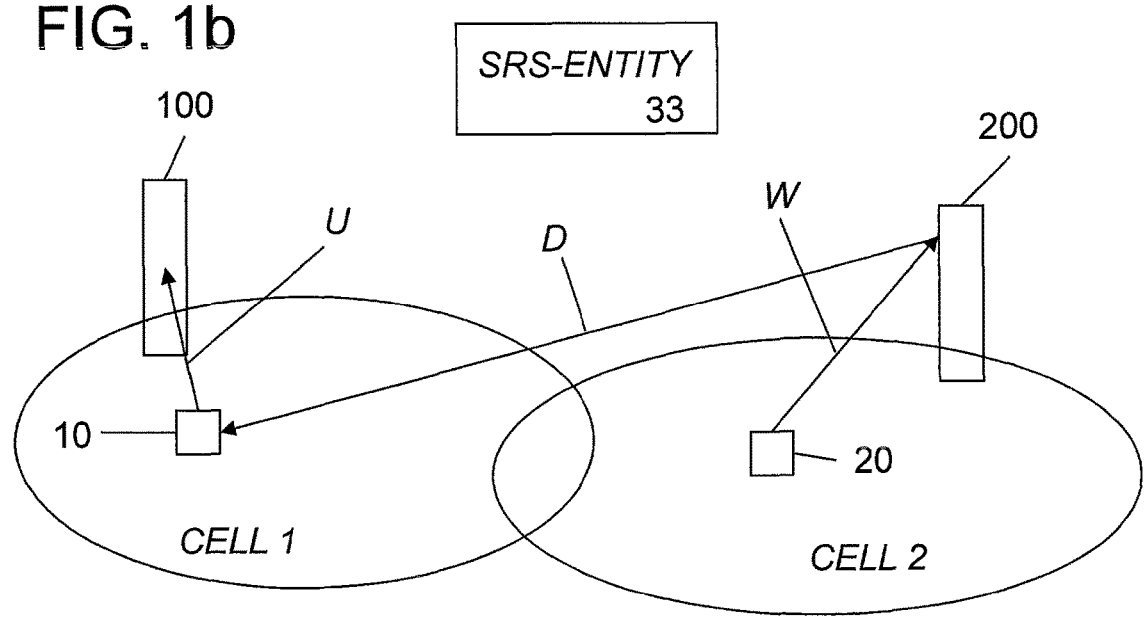
FIG. 1b is a schematic illustration of a particular embodiment of the proposed technology. The drawing illustrates the cooperation between different network nodes.
Figure 2A:
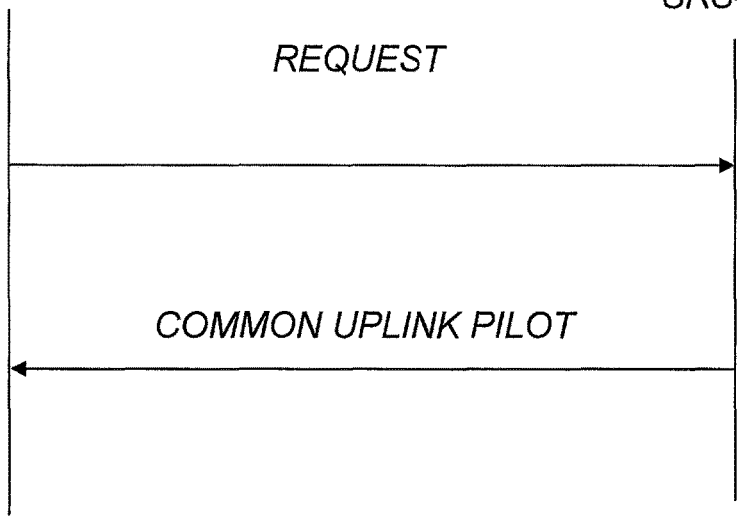
FIG. 2a is a signaling diagram illustrating the signaling between network nodes in a particular embodiment of the proposed technology.
Figure 2B:
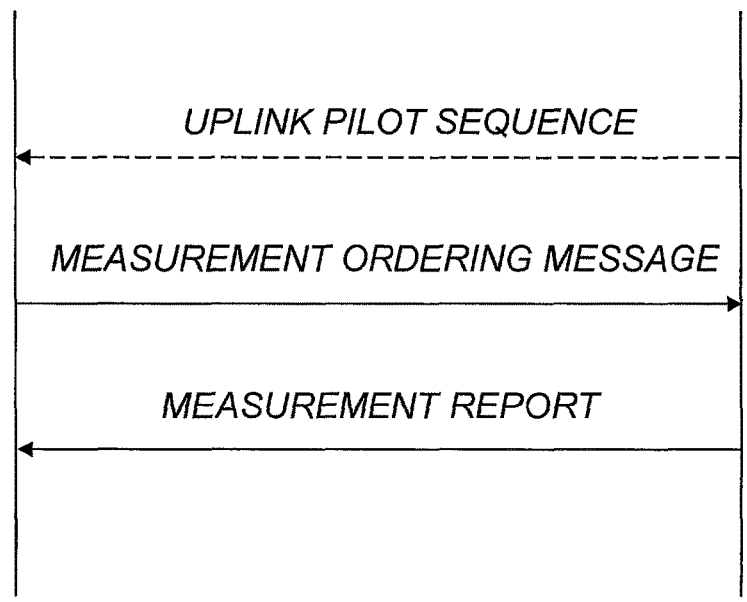
FIG. 2b is a signaling diagram illustrating the signaling between network nodes in an alternative r embodiment of the proposed technology.

Another possible example of the overarching structure of the proposed technology is illustrated in FIG. 1b. In this embodiment another cooperating node, referred to as a Sounding Reference Signal entity, SRS-entity, 33 take part in the cooperation. The SRS-entity 33 may be a network node that is configured to control the radio base stations within the network. In one possible embodiment is the SRS-entity configured to determine a common uplink pilot sequence to be used by the different User Equipment's, UEs, 10, 20 within the wireless communication network. The SRS-entity is also configured to provide information about the determined common uplink pilot sequence to at least a subset of the radio base stations in the wireless communication network. This is done in order to enable each radio base station in the subset of radio base stations to order a UE served by the radio base station to perform measurements on a downlink signal(s) that have been pre-coded to have a configuration that is based on the common uplink pilot sequence. The SRS-entity may either provide the radio base stations with the common uplink pilot sequence, that is, the uplink pilot sequence assigned to two or more UEs, actively by transmitting a message to the radio base stations or it may provide the information based on a request from a radio base station. The purpose of the SRS-entity is to determine which common uplink pilot sequences to be used and keep track of them.

The radio base station 100 may in a particular example of this embodiment request information about which UE is assigned an uplink pilot sequence that is the same as the uplink pilot sequence of another UE 20, served by another radio base stations 20 in another cell. Having obtained the information the radio base station 100 may transmit a measurement ordering message, MOM, to the UE 10 ordering the UE to perform measurements on downlink signals that have a configuration that is based on the uplink pilot sequence assigned to the UE, in this case the common uplink pilot sequence. After that cooperation may proceed as in the earlier described embodiment. That is, the UE 10 performs measurement on downlink signals and report the measurements back to radio base station 100. Based on the reported measurements is the radio base station able to determine whether the uplink pilot sequence has been contaminated. If the radio base station 10 determines that the uplink pilot sequence has been contaminated, the radio base station may assign a new uplink pilot sequence to the UE. The radio base station will also, in some embodiments, inform the SRS-entity about the new assigned pilot uplink sequence to enable the SRS-entity to keep track of the UEs that have common uplink pilot sequences.

Having described the proposed technology on a higher system level, in what follows we will provide more detailed embodiments of the different methods performed by the cooperating nodes in the wireless communication network.

Figure 3:
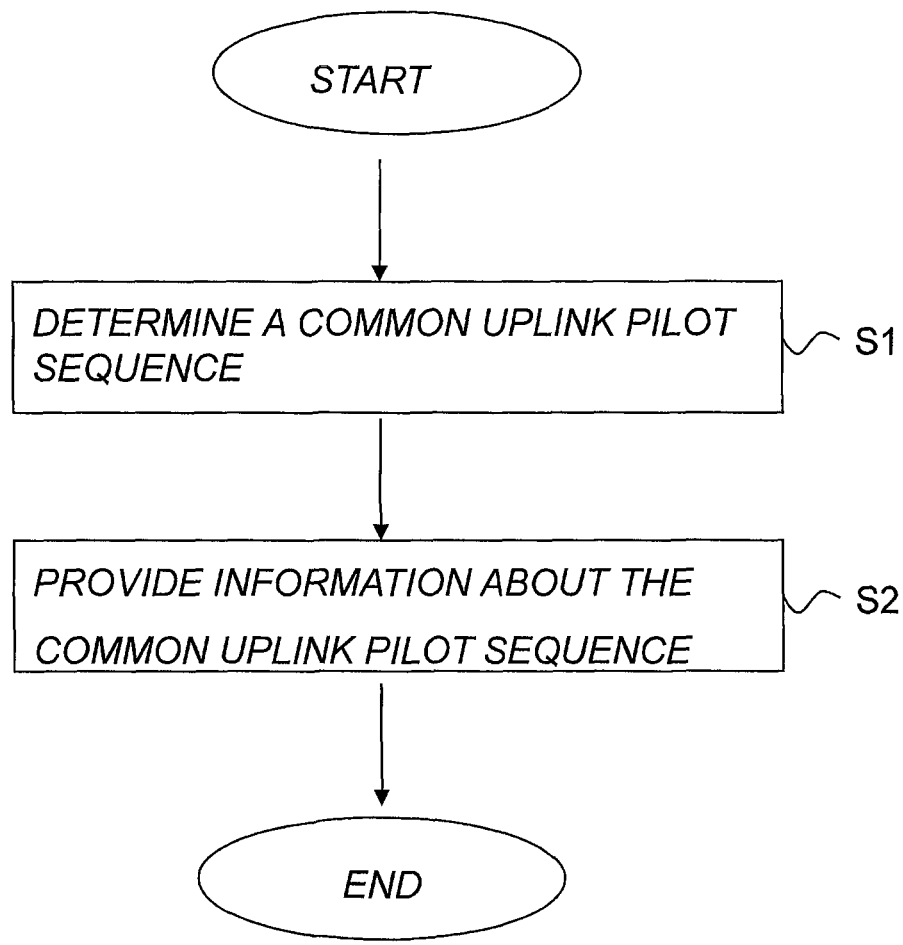
FIG. 3 is a schematic flow diagram illustrating a method according to a particular embodiment of the proposed technology.

The proposed technology provides a method for controlling radio base stations 100, 200 in a wireless communication network. The method comprises the step of determining S1 a common uplink pilot sequence to be used by different User Equipment's, UEs, 10, 20, each UE being served by its own radio base station within the wireless communication network. The method also comprises the step of providing S2 information about the determined common uplink pilot sequence to at least a subset of the radio base stations in the wireless communication network in order to enable each radio base station in the subset of radio base stations to order a UE served by the radio base station to perform measurements on a downlink signal having a configuration that is based on the common uplink pilot sequence. The proposed method acts to determine the uplink pilot sequences that are used by different UEs and control and keep track of this information. The method will aid the radio base station in coordination about which uplink pilot sequence that is associated with a particular downlink signal, e.g. a downlink pilot signal. The method is schematically illustrated in the flow diagram of FIG. 3.

The information is, according to a particular embodiment of the proposed method, provided based on a request from a particular radio base station in the subset of radio base stations.

In an alternative embodiment of the proposed technology is the information provided to the radio base stations by means of a transmitted message that informs each radio base station in the subset of radio base stations about the common uplink pilot sequence.

A particular version of an embodiment of the proposed technology comprises a method wherein the transmitted message comprises information about the downlink configurations that are based on the uplink pilot sequence. Thus the method acts to provide the radio base stations with possible mappings between the uplink pilot sequences used and the corresponding downlink signals.

In still another embodiment of the proposed technology there is provided a method wherein the transmitted message also comprises instructions instructing a radio base station to transmit a measurement ordering message to a UE served by the radio base station and assigned the uplink pilot sequence, where the measurement ordering message orders the UE to perform measurements on downlinks that have a configuration based on the uplink pilot sequence.

In particular embodiments of the proposed technology there is provided a method wherein the downlink signal comprises a downlink pilot sequence such as a Demodulation Reference Signal, DMRS, or a Channel State Information Reference Signal, CSI-RS.

The referred to downlink pilot signals are in general used for downlink channel estimations. The particular DMRS is a signal that is used for channel estimations on the base station in order to detect and demodulate received data correctly.

In all the described embodiments an uplink pilot, or equivalently an uplink pilot sequence, may refer to a Sounding Reference Signal, SRS. SRS is a signal that is used for conveying information about the channel quality that is needed for a base station to perform scheduling decisions.

The proposed method may be performed by a network node, such as a radio base station, in a wireless communication network. It may however also be performed by some other network controlling entity that is capable of controlling radio base stations. The particular network could in all of the described embodiments be a Long Term Evolution network, LTE network. The radio base stations may in all of the described embodiments be adapted for very large multi user MIMO, VL-MIMO.

Figure 4:
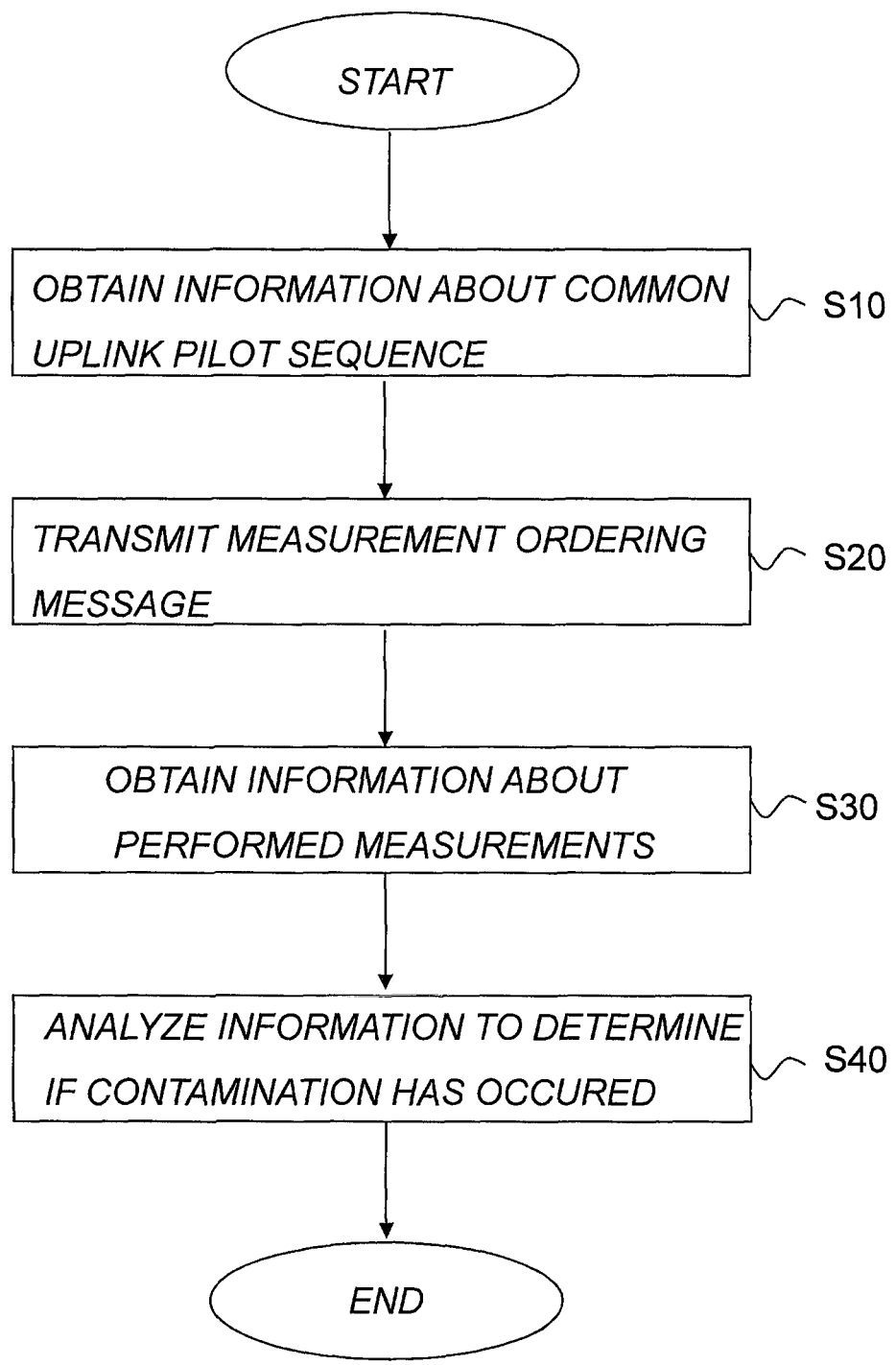
FIG. 4 is a schematic flow diagram illustrating a method according to another particular embodiment of the proposed technology.

The proposed technology also provides a method for operating a radio base station 100 in a wireless communication network. The method comprises the step of obtaining S10 information about a common uplink pilot sequence used by several UEs within the network. The method also comprises the step of transmitting S20 a measurement ordering message to a User Equipment, UE, served by the radio base station 100 and assigned the common uplink sequence. The measurement ordering message comprises instructions ordering the UE to perform measurements on a downlink signal that have a configuration that is based on the uplink pilot sequence assigned to the UE. The method also comprises the steps of obtaining S30 information relating to the performed measurement, and analyzing S40 the obtained information to determine whether uplink pilot contamination has occurred. The method is schematically illustrated in the flow diagram of FIG. 4.

According to a particular embodiment of the proposed method there is provided a method wherein the measurement ordering message further comprises information relating to which downlink signal the UE is intended to perform measurements on.

In other words, the radio base station may incorporate information into the measurement ordering message that specifies the downlink signals that should be targeted by the UE during measurements.

A particular embodiment where such information is incorporated is related to an embodiment of a method wherein the information comprises a set of specified resources on which the UE is ordered to perform measurements on.

That is, the radio base station may incorporate into the measurement ordering message specified resources on which measurements should be performed. These resources may specify particular frequencies that should be target but could also specify particular times/timeslots when measurements should be performed. A combination of these are also possible.

Yet another alternative embodiment provides a method wherein the information comprises instructions ordering the UE to derive the particular downlink signal to perform measurements on based on the uplink pilot sequence used by the UE.

The radio base station may thus order the UE to derive the resources from the uplink pilot sequence assigned to, and used by the UE. This yields an alternative for those cases where the UE possesses the information necessary to derive the resources.

Figure 5:
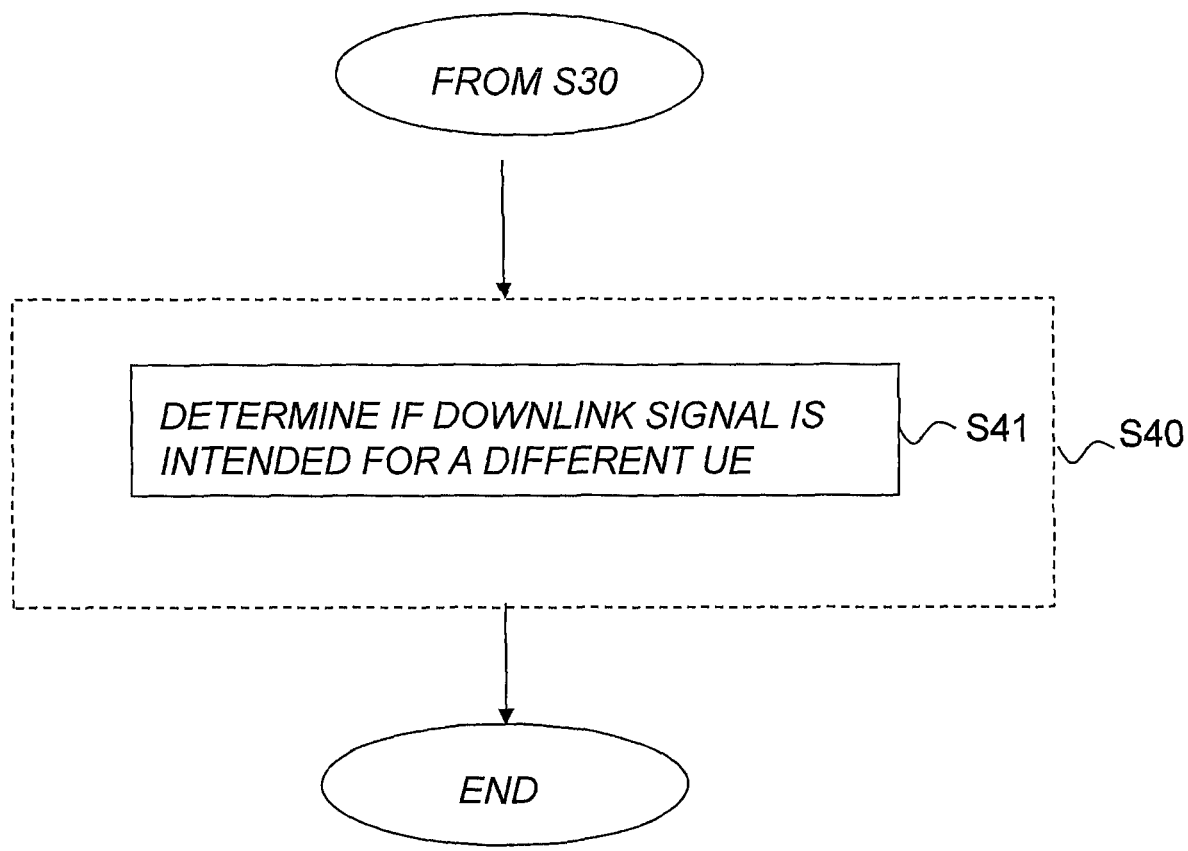
FIG. 5 is a schematic flow diagram illustrating a particular embodiment of the method in FIG. 4.

According to a particular embodiment of the proposed method, the step S40 of analyzing the obtained information about the outcome of the performed measurement comprises the further step S41 of determining whether the downlink signal were intended for a second UE, different from the UE ordered to perform the measurement. This is illustrated schematically in FIG. 5

This embodiment may be advantageous when the UE performs measurements on downlink signals without possessing specified resources on which to measure. Hence the radio base station will obtain information about the downlink signals detected by the UE and needs to determine whether the detected signals corresponds to signals that were aimed at a UE different from the one ordered to perform the measurement. If the UE did detect a signal that targeted another UE then this would constitute a clear indication that the uplink pilot sequence has been contaminated.

By way of example, in a particular embodiment of the proposed method, the step S41 of determining whether the downlink signal was intended for a second UE will also comprise to check whether the radio base station transmitted a downlink signal to the UE in the resource where the measurement detected a signal and conclude that the downlink signal was intended for a different UE if no downlink signal was transmitted to the UE in the resource.

If the radio base station can determine that no downlink signal was transmitted to the UE than it can conclude that the downlink signal emanated from another transmission point/radio base station and consequently that the uplink pilot sequence has been contaminated.

According to a possible embodiment of the proposed technology there is provided a method wherein the measurement ordering message further comprises instructions ordering the UE to transmit a measurement report providing information about the performed measurements to the radio base station based on specified criteria. The use of specified criteria as a trigger for the report ensures that unnecessary signaling is avoided. One criterion or several criteria can be used to determine whether a measurement report should be transmitted.

A particular version of the proposed method comprises a method wherein a criterion corresponds to a predetermined threshold value for a particular signal quantity of the received downlink signal that the UE is ordered to measure.

Still another particular version of the proposed technology provides a method wherein the criterion corresponds to the UE not being able to detect a downlink signal in a resource where a detection of such as downlink signal was expected.

In an optional embodiment of the proposed technology there is provided a method wherein the measurement ordering message further comprises instructions ordering the UE to perform measurements on resources according to a particular blanking pattern.

One example of such a blanking pattern is provided by Channel State Information-Interference Measurements, CSI-IM as used in an LTE network. This has the functionality that the cell, or a radio base station in the cell, that is serving the UE does not send anything on the symbols configured as CSI-IM which implies that the UE can measure how much the other cells are transmitting on these resources. But this does not imply that the other cells are transmitting a particular reference symbol on these resources, it may be that data or some unknown reference symbols are transmitted on these symbols hence the UE configuration is only where is the own cell blanking. In some configurations of CSI-IM some of the neighboring cells are also blanking on the same resources. If, for example, we have two candidate interferers, such as cell A and cell B, we may configure CSI-IM-1 such that our own cell blanks and cell A blanks hence this resource can detect interference from cell B, or some other cell different from cell A, CSI-IM-2 is configured in the opposite way and can thus measure cell A. The UE may thus be ordered to measure on specified resources that has been blanked, if the UE detects signals or data in these resources it may be seen as an indication that the uplink pilot sequence has been contaminated and that the UE should transmit a measurement report that will enable the radio base station to determine if that is the case.

In an exemplary version of the proposed method is the measurement ordering message transmitted to the UE when triggered by an uplink pilot sequence received from the UE. That is, the method will be triggered to transmit the measurement ordering message when it receives an uplink pilot sequence from the UE. That is, the radio base station may initiate the method upon receiving an uplink pilot from the UE.

In certain optional embodiments may each of the UEs assigned the common uplink pilot sequence be served by a separate radio base station. It is however also possible that several UEs are served by a common radio base station. This may for example be the case when the method is implemented in a base station that can control multiple transmission points.

According to particular embodiments of the proposed technology there is provided a method wherein the downlink signal comprises a downlink pilot signal such as a Demodulation Reference Signal, DMRS, or a Channel State Information Reference Signal, CSI-RS.

Hence all that has been described relating to embodiments of the particular method may relate to downlink signals that are downlink pilot signals.

The referred to downlink pilot signals are in general used for downlink channel estimations. The particular DMRS is a signal that is used for channel estimations on the base station in order to detect and demodulate received data correctly.

In all of the described embodiments could the term uplink pilot, or equivalently uplink pilot sequence, refer to a Sounding Reference Signal, SRS. SRS is a signal that is used for conveying information about the channel quality that is needed for a base station to perform scheduling decisions.

The described embodiments of the method may also incorporate an optional step of assigning a new uplink pilot sequence to a UE if the method determines that the uplink pilot sequence used has been contaminated.

The proposed method may be performed by a radio base station in a wireless communication network. The particular wireless communication network may in all of the described embodiments be a Long Term Evolution network, LTE network. The radio base stations may in all of the described embodiments be adapted for very-large multi-user MIMO, VL-MIMO.

Figure 6:
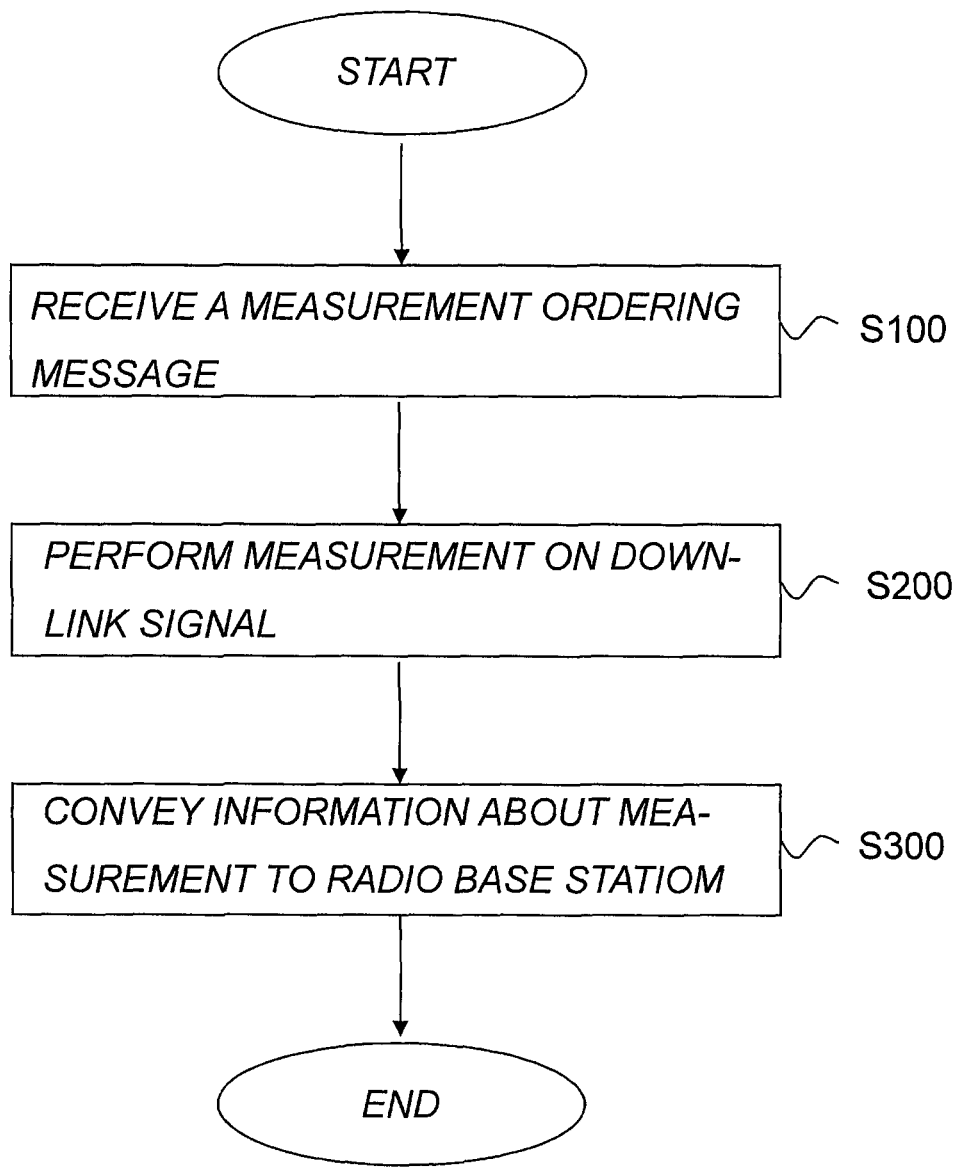
FIG. 6 is a schematic flow diagram illustrating a method according to still another particular embodiment of the proposed technology.

The proposed technology also relates to a method for operating a User Equipment, UE, 10. The method comprises the step of receiving S100 a measurement ordering message comprising instructions to perform measurements on a downlink signal having a configuration that is based on an uplink pilot sequence assigned to the UE 10. The method also comprises the step of performing S200 measurements on the downlink signals and conveying S300 information about the measurements to a radio base station 100 serving the UE 10 to enable the radio base station 100 to determine whether uplink pilot contamination has occurred. The method is schematically illustrated in the flow diagram of FIG. 6.

The proposed method cooperates with the earlier described methods. The method enables the radio base station to determine whether the uplink pilot sequence used by the UE has been contaminated. This also enables the radio base station or some other network node to assign a new uplink pilot sequence to the UE if the one currently used is determined to be contaminated.

A particular embodiment of the proposed technology provides a method wherein the step S200 of performing measurements on downlink signals comprises to perform measurements on downlink signals that can be identified by information comprised in the measurement ordering message.

The measurement ordering message may, as has been described earlier, contain information that specifies the downlink signal(s) to be targeted by the UE when performing measurements.

A particular embodiment of a method where the measurement ordering message comprises such information relates to a method wherein the measurement is performed on specified resources, where information about the specified resources is provided by the measurement ordering message.

The measurement ordering message may, as has been described earlier, contain information that specifies the resources on which measurements should be performed. These resources may specify particular frequencies that should be target but could also specify particular times/timeslots when measurements should be performed. A combination of these is also possible.

Still another exemplary embodiment provides a method wherein the measurement is performed on downlink signals that are derived from the uplink pilot sequence assigned to the UE 10.

This particular embodiment may be deemed advantageous and time efficient since the UE itself may derive the resources on which to measure. This provides a useful alternative and may be used in those cases where the UE has the necessary information to derive the resources.

Yet another possible embodiment provides a method a wherein the step S200 of performing measurements on downlink signals is executed if an uplink pilot sequence has been transmitted to the radio base station serving the UE.

That is, the UE may transmit an uplink pilot sequence to its serving radio base station, thereby triggering the cooperating methods.

By way of example, a particular embodiment of the proposed technology provides a method wherein measurements are performed on time and/or frequency resources derived from the time when the uplink pilot sequence was transmitted to the radio base station and/or the frequency used when transmitting the uplink pilot sequence to the radio base station.

That is, having transmitted an uplink pilot sequence to its serving radio base the UE may derive the resources on which to measure based on time and frequency data of the transmitted uplink pilot sequence.

According to yet another particular embodiment of the proposed technology there is provided a method wherein information about the outcome of the measurements is conveyed to the base station 100 if the result of the measurement fulfills predetermined criteria. The use of specified criteria ensures that unnecessary signaling between the UE and its serving radio base station is avoided. The criteria may comprise a single criterion or may be a combination of several criteria. Examples of which will be given below.

According to a particular version of an embodiment of the proposed technology there is provided a method, wherein the criterion comprises a threshold value and wherein the information is conveyed to the radio base station based on the outcome of a comparison between the threshold value and a measured signal quantity.

By way of example, in a version of the method the measured signal quantity comprises the received signal power of the measured downlink signal.

According to yet another embodiment of the proposed technology there is provided a method wherein the criterion corresponds to the detection of a downlink signal in a resource that is subject to a blanking pattern. That is, if the specified resource has been blanked and the UE is still able to detect a signal in the resource this provides a good indication that the uplink pilot has been contaminated, and that the UE therefore should report the measurement to the radio base station. One particular example of such a blanking pattern is provided by Channel State Information-Interference Measurements, CSI-IM as used in an LTE network.

The described embodiments of the method may be related to the case wherein the downlink signal comprises a downlink pilot signal such as a Demodulation Reference Signal, DMRS, or a Channel State Information Reference Signal, CSI-RS.

The referred to downlink pilot signals are in general used for downlink channel estimations. The particular DMRS is a signal that is used for channel estimations on the base station in order to detect and demodulate received data correctly.

In all of the described embodiments an uplink pilot, or equivalently an uplink pilot sequence, may refer to a Sounding Reference Signal, SRS. SRS is a signal that is used for conveying information about the channel quality that is needed for a base station to perform scheduling decisions.

The method may be performed by a User Equipment in a wireless communication network. The particular wireless communication network could in all of the described embodiments be a Long Term Evolution network, LTE network. The radio base stations may in all of the described embodiments be adapted for very large multi user MIMO, VL-MIMO.

Figure 7:
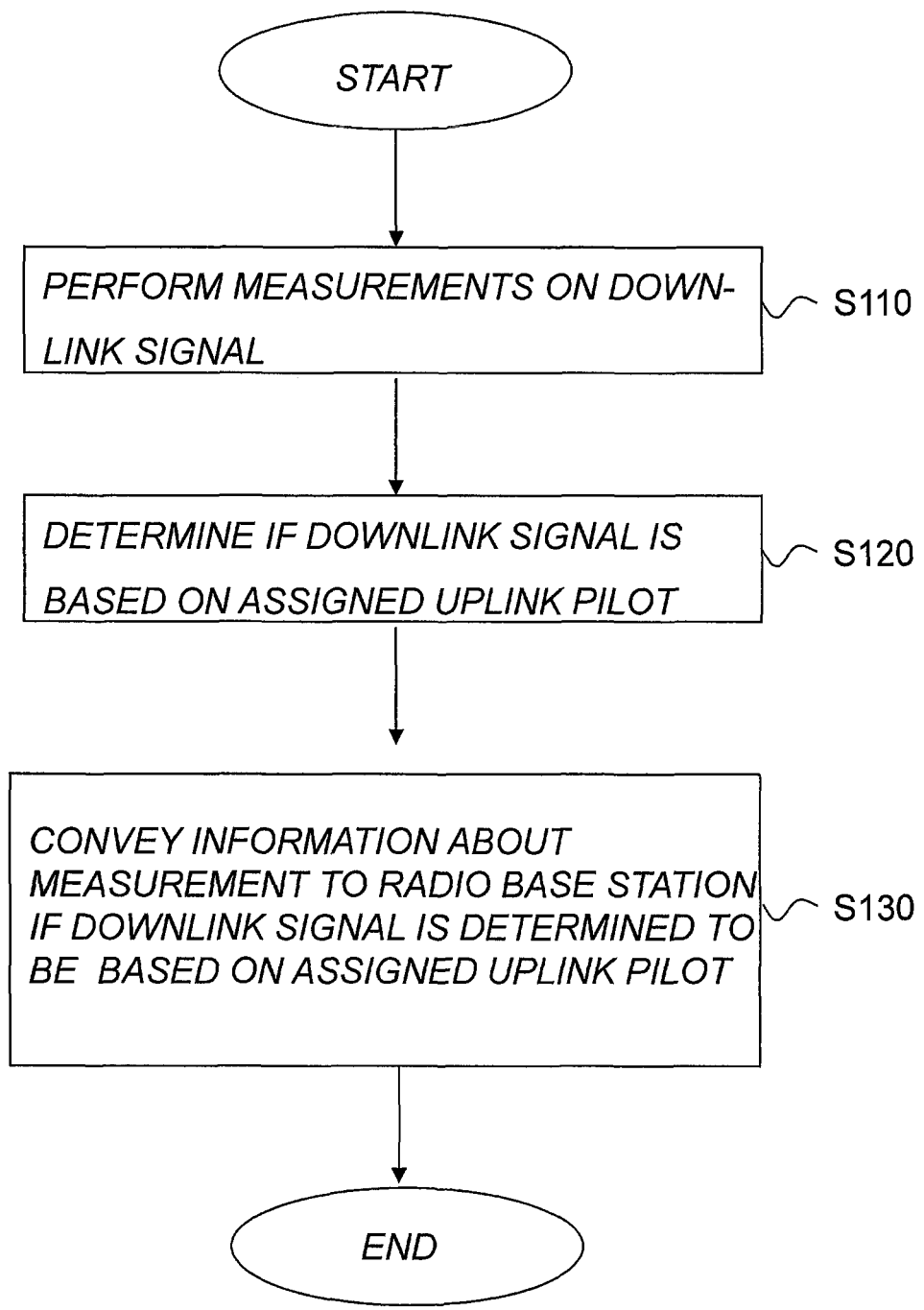
FIG. 7 is a schematic flow diagram illustrating a method according to yet another particular embodiment of the proposed technology.

An alternative version of the proposed technology provides a method for operating a User Equipment, UE, wherein the method comprises the step S110 of performing measurements on downlink signals. The method also comprises the step S120 of determining S120 whether the downlink signals have a signal configuration that has been generated based on an uplink pilot sequence being essentially the same as an uplink pilot sequence assigned to the UE. The method also comprises the step S130 of conveying information about the measurements performed on the downlink signals determined to have the signal configuration to a radio base station serving the UE to enable the radio base station to determine whether uplink pilot contamination has occurred. The method is schematically illustrated in the flow diagram of FIG. 7.

In other words, the method provides an alternative to the earlier described method in that the UE does not wait for a measurement ordering message to arrive before performing the measurements. Instead the UE itself begin to measure on downlink signals and conveys the information to the radio base station. In this way the method enables a radio base station to determine if the uplink pilot has been contaminated without having to trigger a measurement.

According to a particular embodiment of the proposed technology there is provided a method wherein the step S110 of performing measurements on downlink signals is executed if an uplink pilot sequence has been transmitted to the radio base station serving the UE. That is, the UE 10 begins performing measurements on the downlink signals after having transmitted an uplink pilot sequence to the radio base station 100.

A particular embodiment provides a method, wherein measurements are performed on time and/or frequency resources derived from the time when the uplink pilot sequence was transmitted to the radio base station 100 and/or the frequency used when transmitting the uplink pilot sequence to the radio base station 100.

Still another embodiment provides a method wherein the step S120 of determining whether the downlink signals have a configuration that has been generated based on an uplink pilot sequence essentially the same as the uplink pilot sequence assigned to the UE comprises to check whether the downlink signal can be derived from the uplink pilot sequence assigned to the UE. That is, the UE checks the configuration of the downlink signal in order to determine whether it is based on the uplink pilot sequence assigned to the UE. In this way the method may only convey the measurements that are relevant for determining whether the uplink pilot sequence has been contaminated.

A further embodiment provides a method wherein information about the measurements is conveyed to the radio base station if the result of the measurement fulfills predetermined criteria. These criteria may be the same criteria as the ones described earlier, e.g. by means of a comparison between a threshold value and a measured signal quantity such as the received signal power of the measured downlink signal, or a criteria that corresponds to the case that the UE is not able to detect a downlink signal in a resource where a detection of such as downlink signal was expected. Hence if the UE expected to detect a signal in specified resource but did not, this provides an indication that the uplink pilot sequence may have been contaminated. Hence the UE may include such information in the information to be conveyed to the radio base station.

The described embodiments of the method may be related to the case wherein the downlink signal comprises a downlink pilot signal such as a Demodulation Reference Signal, DMRS, or a Channel State Information Reference Signal, CSI-RS.

The referred to downlink pilot signals are in general used for downlink channel estimations. The particular DMRS is a signal that is used for channel estimations on the base station in order to detect and demodulate received data correctly.

In all of the described embodiments an uplink pilot, or equivalently an uplink pilot sequence, may refer to a Sounding Reference Signal, SRS. SRS is a signal that is used for conveying information about the channel quality that is needed for a base station to perform scheduling decisions.

The method may be performed by a UE in a wireless communication network. The particular wireless communication network could in all of the described embodiments be a Long Term Evolution network, LTE network. The radio base stations may in all of the described embodiments be adapted for very large multi user MIMO, VL-MIMO.

Figure 8:
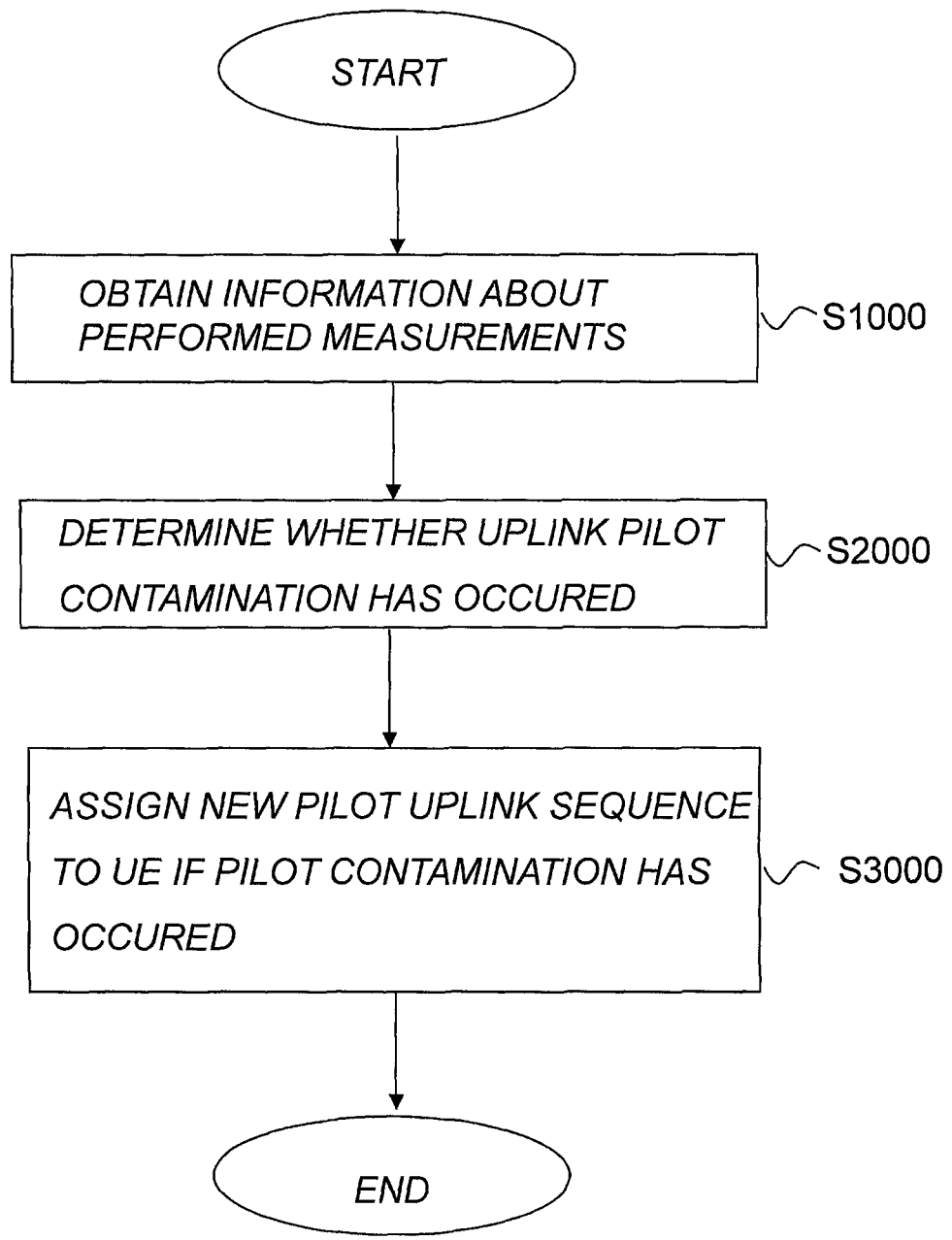
FIG. 8 is a schematic flow diagram illustrating a method according to a particular embodiment of the proposed technology.

According to another aspect of the proposed technology there is provided a method for assigning an uplink pilot sequence to a UE in a wireless communication network. The method comprises the step S1000 of obtaining information about measurements performed by a UE on downlinks that are based on an uplink pilot sequence essentially the same as the uplink pilot sequence assigned to the UE. The method also comprises the step S2000 of determining, based on the obtained information, whether uplink pilot contamination has occurred. The method also comprises the step of S3000 of assigning a new uplink pilot sequence to the UE if it is determined that uplink pilot contamination has occurred. The method is schematically illustrated in the flow diagram of FIG. 8.

That is, the method determines if an uplink pilot sequence has been contaminated based on measurements performed by a UE. If the uplink pilot sequence is determined to be contaminated the method assigns a new uplink pilot sequence to be used by the UE for future channel estimations.

The described embodiments of the method may be related to the case wherein the downlink signal comprises a downlink pilot signal such as a Demodulation Reference Signal, DMRS, or a Channel State Information Reference Signal, CSI-RS.

The referred to downlink pilot signals are in general used for downlink channel estimations. The particular DMRS is a signal that is used for channel estimations on the base station in order to detect and demodulate received data correctly.

In all of the described embodiments an uplink pilot, or equivalently an uplink pilot sequence, may refer to a Sounding Reference Signal, SRS. SRS is a signal that is used for conveying information about the channel quality that is needed for a base station to perform scheduling decisions.

The method may be performed by a radio base station serving the particular UE, but it may also be performed by some other network node or entity, such as the earlier described network node referred to as an SRS-entity.

The particular wireless communication network could in all of the described embodiments be a Long Term Evolution network, LTE network. The radio base stations may in all of the described embodiments be adapted for very large multi user MIMO, VL-MIMO.

Below is provided a number of specific examples that illustrate exemplary embodiments of the proposed technology. The provided examples should not be considered as limitations to the disclosed technology, they are on the contrary included to aid a reader in the understanding of the concepts provided by the proposed technology. So even if the examples are related to, e.g., the use of certain specified signals these signals are not the only signals for which the proposed technology can be used. The measurements to be performed according to the proposed technology can for example be used for all types of downlink signals, both for downlink pilot signals and other downlink signals, such as signals transmitting data, having configurations that are based on an uplink pilot sequence that is common for several UEs within the network.

Figure 9A:
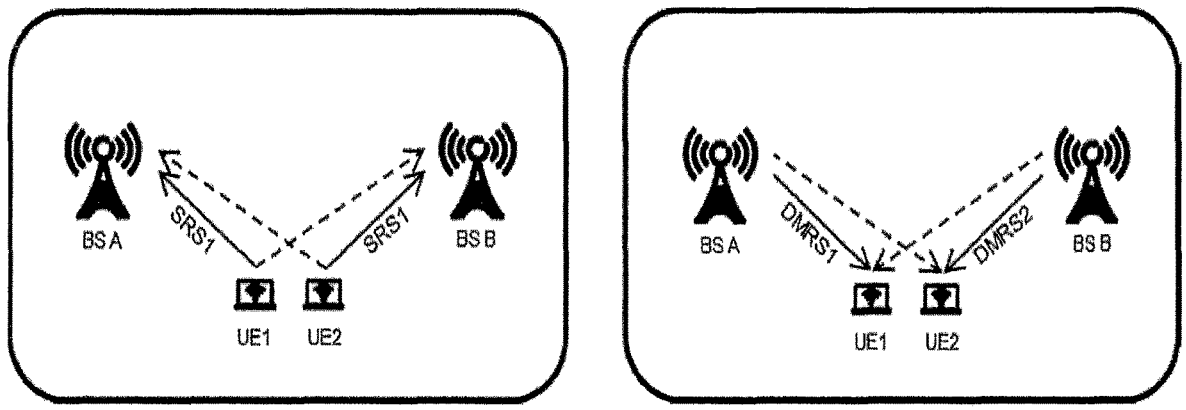
FIG. 9a is a schematic drawing illustrating a particular example of an embodiment according to the proposed technology.
Figure 9B:
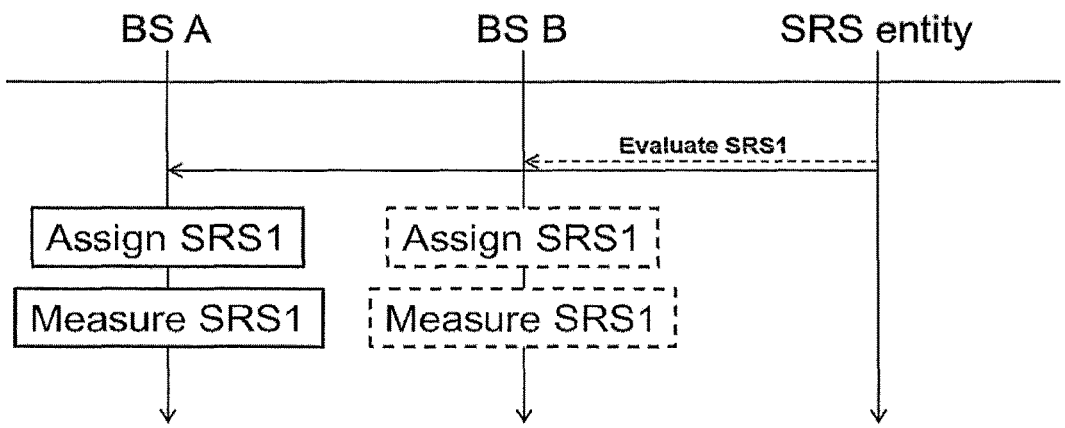
FIG. 9b is a signaling diagram illustrating the signaling between different nodes in a particular example of an embodiment according to the proposed technology.

Reference is made to FIG. 9a. FIG. 9a depicts, two UEs, UE1 and UE2, that are served by different radio base stations, radio base station A, BSA and radio base station B, BSB, respectively. In this particular example both UE1 and UE2 are transmitting the same pilot uplink sequences, namely a Sounding Reference Signal, SRS, denoted SRS1, which is used by BS A and BS B respectively for Channel State Information estimations, CSI estimations. The SRS may have been obtained from a network node 33 referred to as a SRS-entity. The signaling diagram illustrating this SRS assignment is schematically shown in FIG. 9b. The estimations may then be used to calculate pre-coders for the subsequent transmissions of downlink signals. Due to pilot contamination, this implies that the pre-coder calculated in BS A for beam-forming towards UE1 will also beam-form to UE2 and vice versa. If the physical channel between UE1 and BS B is not orthogonal and weak compared to the physical channel between UE2 and BS B, or similarly, if the physical channel between UE2 and BS A is not orthogonal and weak compared to the physical channel between UE1 and BS A, then severe performance degradation may occur due to the pilot contamination. Hence, it is desirable to detect the UEs that are prone to the pilot contamination problem so that either orthogonal SRSs are assigned to them or no simultaneous DL transmissions are performed towards them.

The proposed technology aims in this particular example to detect pilot contamination for two transmission/reception points A, corresponding to BS A, and B, corresponding to BS B, that use the same uplink sounding pilot sequence, SRS1, for the two UEs, UE1 in A and UE2 in B. The idea in this particular example is to assign orthogonal downlink pilots DMRS1, from BS A and DMRS2, from BS B, and to instruct UE1 to measure on DMRS2. DMRS is an abbreviation of Demodulation Reference Signal. This exemplary procedure may in certain embodiments be complemented by instructing UE2 to measure on DMRS1. The radio base station A, BS A, may therefor transmit a measurement ordering message to the UE instructing the UE to perform measurements on a downlink signal that has another transmission point. The measurements performed by UE1 should then be transmitted in a measurement report to the radio base station. If the UE report contains a large measurement value this provides an indication that there might be pilot contamination between UE1 and UE2 and, as a consequence, that these two UEs should not use the same pilot for uplink sounding, UL-sounding.

Another example of the proposed technology relates to a scenario that is briefly depicted in FIG. 1a, the right figure. The idea in this particular example is to use two orthogonal downlink pilots, DL pilots. These pilots may be either a DMRS or a CSI-RS. In the case of a DMRS the two orthogonal downlink pilots are denoted DMRS1 and DMRS2. These DL-pilots are used during DL transmissions to UE1 and UE2 respectively and they instruct UE1 to measure and report on DMRS2 and in some embodiments they may also instruct UE2 to measure and report on DMRS1. Based on the measurement ordering instructions carried by the downlink signals the UEs will perform the relevant measurements and report information about the measurements back to the radio base station. If the UE measurement report contains a large measurement value, for example, this will provide an indication that there can be pilot contamination between UE1 and UE2 and hence that these two UEs should not use the same pilot for UL-sounding. The radio base station may then determine, based on the reported measurement that pilot contamination has occurred. The radio base station A may then, in a particular embodiment of the proposed technology assign a new pilot uplink sequence to the UE1.

As has been described earlier in this application, according to the proposed technology, two or more base stations may collaborate in assigning pilot sequences for UL-SRS with the help of a managing entity referred to as an SRS entity. This is illustrated in the signaling diagram of FIG. 9b for the case of two radio base stations A and B. Note that in some embodiments the SRS entity may reside in either or all of collaborating base stations, for instance BS A or BS B or both in FIG. 9B. Also note in that BS A and BS B in some embodiments may be the same base station, for example, two cells in a LTE eNodeB.

Figure 10A:
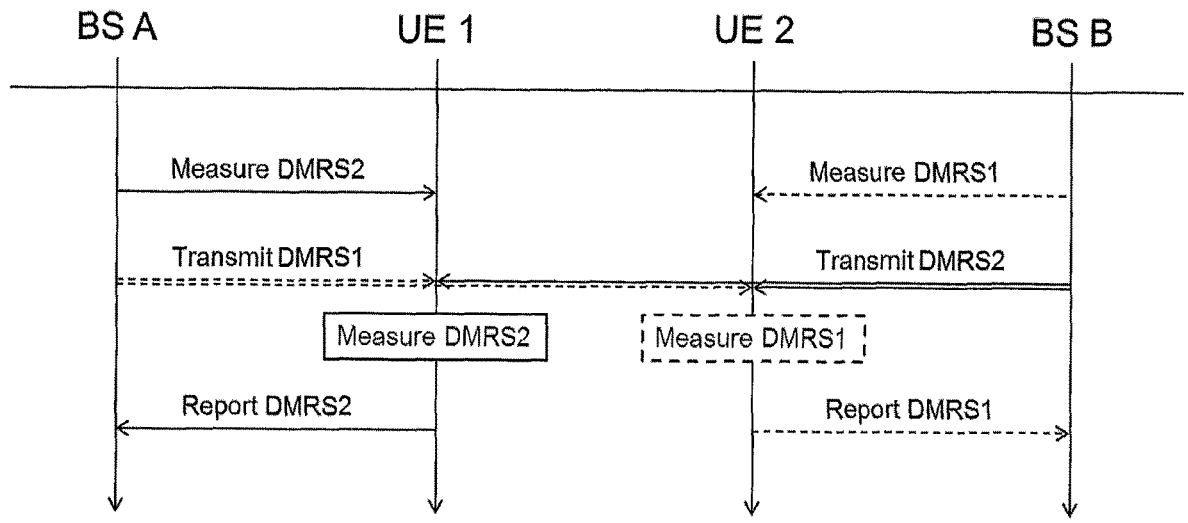
FIG. 10a is a signaling diagram illustrating the signaling between different nodes in another particular example of an embodiment according to the proposed technology.

For simplicity of the exposition, we assume in this example that there are two base stations A and B that are serving two user equipments UE1 and UE2 respectively, see FIG. 1a for example. In some embodiment, only one UE, UE2 for example, is scheduled for transmission from BS B and UE1 is only measuring on DMRS2. The SRS entity evaluating the pilot assignment in the two base stations will assign different DL pilots for the two UEs when the two UEs are scheduled for simultaneous transmission. In some embodiment, the DL pilots are demodulation reference symbols for the data transmissions, they may for example be DMRS1 and DMRS2. In some embodiments could the assigned pilots be separate from the demodulation pilots specific for measuring interference, e.g. CSI-RS and in some embodiments some resource-elements are transmitted with zero power in the own transmission. Then UE1 is instructed to measure and report on DMRS2. In some embodiments, UE2 is also instructed to measure and report on DMRS1. This procedure is illustrated in FIG. 10a. Note that in some embodiments, the measurement is compared to interference and noise measured on other resources to detect the difference between pilot contamination and other interference. In some embodiments are all users with the same uplink pilot configured with a joint blanking pattern with empty resource elements to estimate interference. One example of such patterns is provided by Channel State Information-Interference Measurements, CSI-IM as used in an LTE network. This has the functionality that the cell, or a radio base station in the cell, that is serving the UE does not send anything on the symbols configured as CSI-IM which implies that the UE can measure how much the other cells are transmitting on these resources. But this does not imply that the other cells are transmitting a particular reference symbol on these resources, it may be that data or some unknown reference symbols are transmitted on these symbols hence the UE configuration is only where is the own cell blanking. In some configurations of CSI-IM some of the neighboring cells are also blanking on the same resources. If, for example, we have two candidate interferers, such as cell A and cell B, we may configure CSI-IM-1 such that our own cell blanks and cell A blanks hence this resource can detect interference from cell B, or some other cell different from cell A, CSI-IM-2 is configured in the opposite way and can thus measure cell A.

Figure 10B:
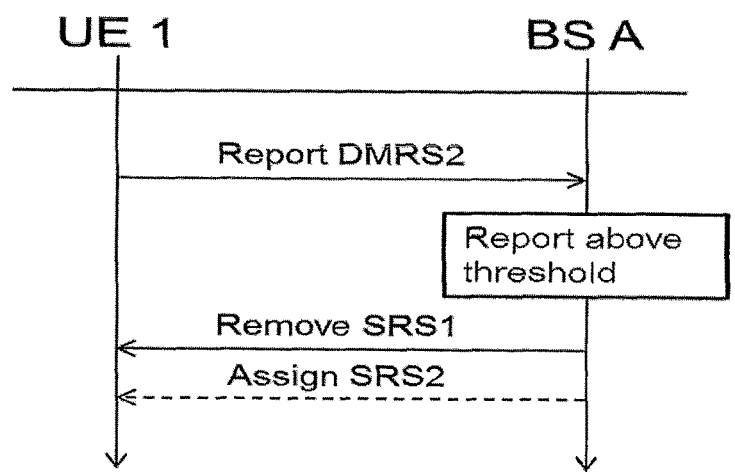
FIG. 10b is a signaling diagram illustrating the signaling between different nodes in still another particular example of an embodiment according to the proposed technology.

If the measurement report from UE1 indicates that the SRS1 is contaminated, for example, if the measurement is above a threshold, then the SRS1 may be removed from UE1 and in some scenarios could a different UL-SRS, SRS2, be assigned to UE1, this is schematically depicted in FIG. 10b.

In some embodiments will the measurement report only be transmitted when the measurement fulfills a given condition, or a given criteria, e.g. if the measurement is above a threshold or a threshold relative to the serving signal. In some embodiment, the reporting is encoded relative to a fixed reference, e.g. received power. In other embodiments, the reporting is encoded relative to the serving signal or some other received signal, e.g. broadcasted signal. In some embodiment, the reporting may be frequency dependent with separate reporting for different frequency parts of the transmission bandwidth. In this embodiment the SRS may be configured in a way such that they are overlapping with a SRS of a UE in a different cell only in parts of the bandwidth, and overlapping with other UEs on other parts of the band. Detection of pilot contamination can be done by detecting the parts of the bandwidth that different UEs detect large interference, by having frequency selective reporting of interference. By employing different patterns in different cells it is possible to not only detect the SRS causing the contamination but also the BS where it is used.

According to the proposed technology there is also provided devices such as network nodes, radio base stations and UEs that are configured to perform the earlier described methods. In what follows various embodiments of these devices will be described.

The proposed technology in particular provides a network node 33 that is configured for controlling radio base stations 100, 200 in a wireless communication network. The network node 33 is configured to determine a common uplink pilot sequence to be used by different User Equipment's, UEs, 10, 20 within the wireless communication network, where each of the UEs 10,20 is served by a separate radio base station. The network node 33 is also configured to provide information about the determined common uplink pilot sequence to at least a subset of the radio base stations in the wireless communication network in order to enable each radio base station in the subset of radio base stations to order a UE served by the radio base station to perform measurements on a downlink signal that have a configuration that is based on the common uplink pilot sequence. The network node is schematically illustrated in the block diagram of FIG. 11.

An embodiment of the proposed network node provides a network node 33 that is configured to provide the information based on a request from a particular radio base station in the subset of radio base stations.

Yet another embodiment provides a network node 33, wherein the network node 33 is configured to provide information by means of a transmitted message that informs each radio base station in the subset of radio base stations about the common uplink pilot sequence.

Still another embodiment provides a network node 33 wherein the network node 33 is configured to transmit a message that comprises information about the downlink configurations that are based on the uplink pilot sequence.

A further exemplary embodiment provides a network node 33, wherein the network node 33 is configured to transmit a message that also comprises instructions instructing at least one radio base station to transmit a measurement ordering message to a UE that is assigned the uplink pilot sequence, the measurement ordering message ordering the UE to perform measurements on downlinks that have a configuration based on the uplink pilot sequence.

According to an optional embodiment there is provided a network node 33 wherein the downlink signal comprises a downlink pilot signal such as a Demodulation Reference Signal, DMRS, or a Channel State Information Reference Signal, CSI-RS.

Figure 11:
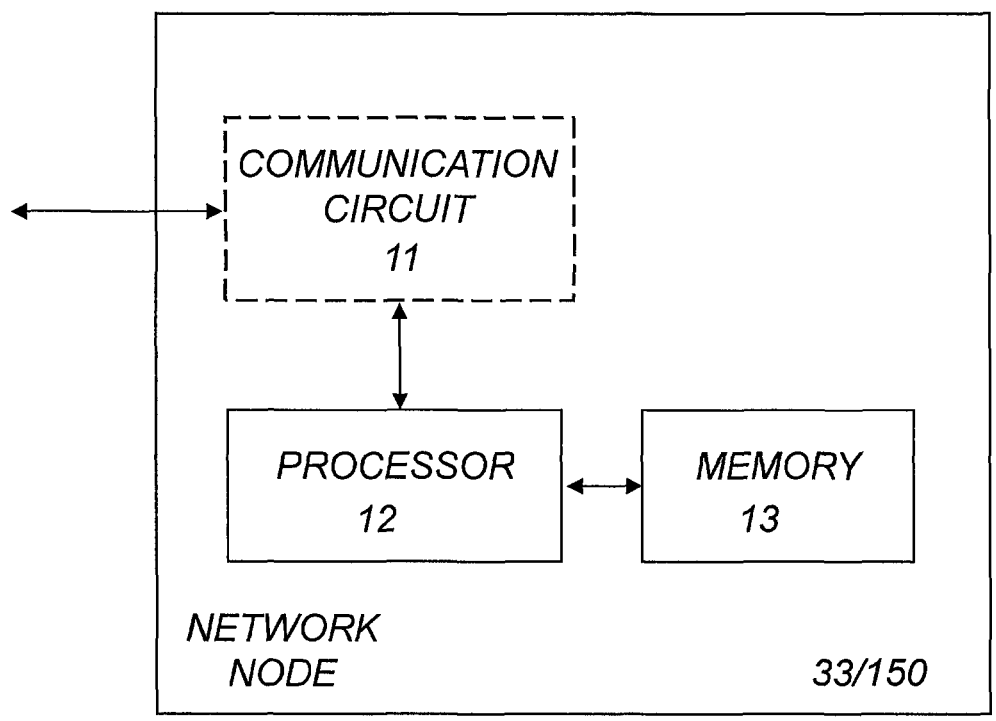
FIG. 11 is a block diagram illustrating a network node according to a particular embodiment of the proposed technology.

In a particular example, the network node 33 comprises a processor and a memory, the memory comprising instructions executable by the processor, whereby the apparatus/processor is operative to control radio base stations. FIG. 11 is a schematic block diagram illustrating an example of a network node comprising a processor 12 and an associated memory 13. The block diagram also shows an optional communication circuitry 11.

The workings of the described network node 33 may be prosecuted by means of a computer program 125 that comprises instructions, which when executed by at least one processor, cause the processor(s) to:
- determine a common uplink pilot sequence to be used by different User Equipment's, UEs, within a wireless communication network, each of the UEs being served by a separate radio base station;
- output information about the determined common uplink pilot sequence to enable at least a subset of the radio base stations in the wireless communication network to obtain the information in order for the radio base stations to be able order a UE served by the radio base station to perform measurements on a downlink signal having a configuration that is based on the common uplink pilot sequence.

Figure 14:
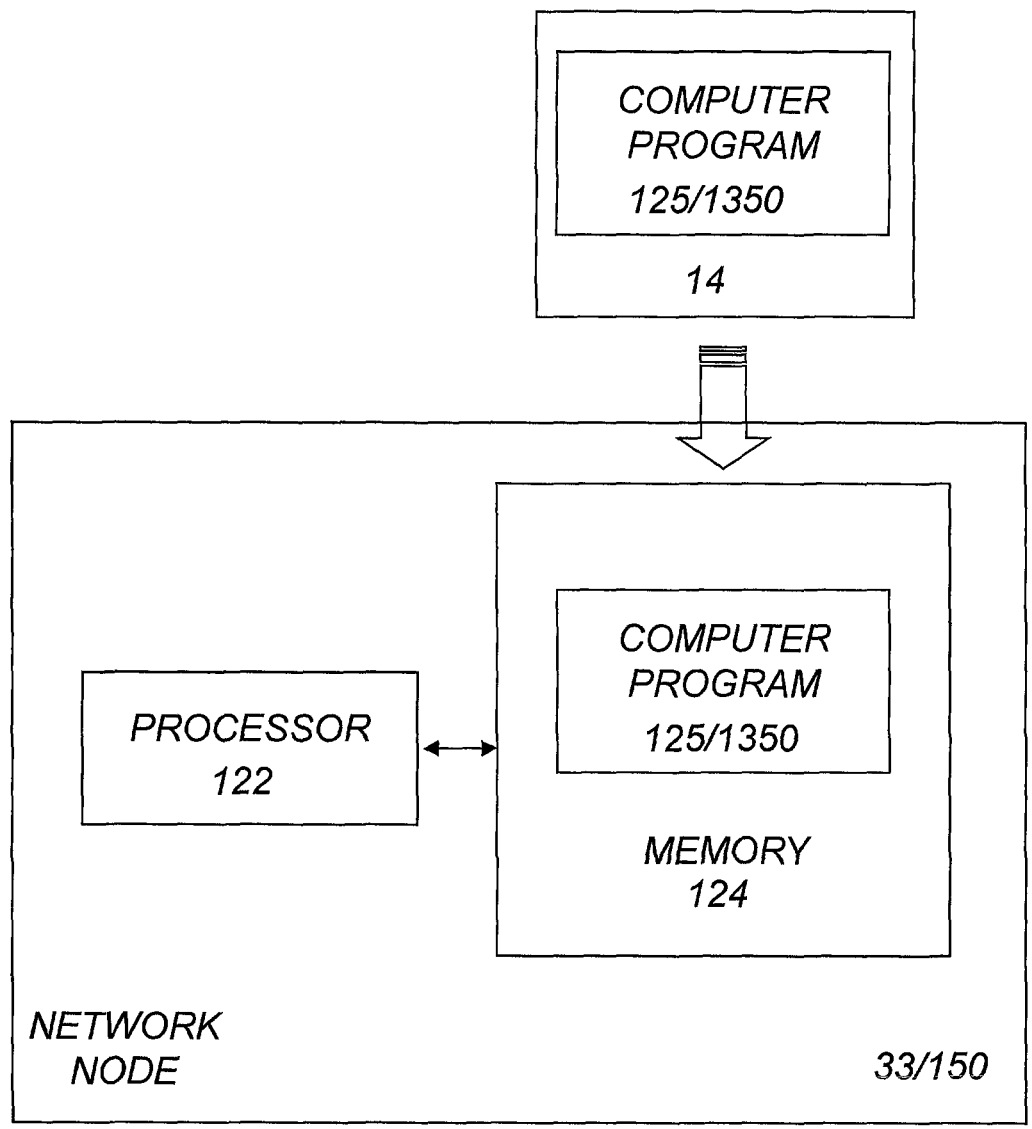
FIG. 14 is a block diagram illustrating a network node using a computer program according to the proposed technology.

FIG. 14 illustrates how a computer program 125 is utilized in a particular embodiment of a network node 33. The proposed technology also provides a computer-program product 14 comprising a computer-readable medium having stored thereon the computer program 125.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium. FIG. 14 illustrates how a computer program 125 is utilized in a particular embodiment of a network node 33.

The proposed technology also provides a radio base station 100 wherein, the radio base station 100 is configured to obtain information about a common uplink pilot sequence used by several UEs within the network. The radio base 100 station is also configured to transmit a measurement ordering message to a User Equipment, UE, served by the radio base station 100 and assigned the common uplink pilot sequence, the measurement ordering message comprising instructions ordering the UE to perform measurements on a downlink signal having a configuration that is based on the uplink pilot sequence assigned to the UE. The radio base station 100 is also configured to obtain information relating to the performed measurement. The radio base station 100 is furthermore configured to analyze the obtained information to determine whether uplink pilot contamination has occurred. The radio base station is schematically illustrated in the block diagram of FIGS. 12 and 13.

A particular embodiment provides a radio base station 100, wherein the radio base station 100 is configured to transmit a measurement ordering message that also comprises information relating to which downlink signal the UE is intended to perform measurements on.

Another possible embodiment discloses a radio base station 100, wherein the information comprises a set of specified resources on which the UE is ordered to perform measurements on.

Still another disclosed embodiment provide a radio base station 100, wherein the information comprises instructions ordering the UE to derive the particular downlink signal to perform measurements on based on the uplink pilot sequence used by the UE.

An optional embodiment provides a radio base station 100, wherein the radio base station 100 is configured to analyze the obtained information about the outcome of the performed measurement by being configured to determine whether the downlink signal were intended for a second UE, different from the UE ordered to perform the measurement.

By way of example, a possible embodiment provides a radio base station, wherein the radio base station 100 is configured to determine whether the downlink signal were intended for a second UE by means of checking whether the radio base station transmitted a downlink signal to the UE in the resource where the measurement detected a signal and conclude that the downlink signal were intended for a different UE if no downlink signal were transmitted to the UE in the resource.

Another embodiment of the proposed technology provides a radio base station, wherein the radio base station 100 is configured to transmit a measurement ordering message that also comprises instructions ordering the UE to transmit a measurement report providing information about the performed measurements to the radio base station based on specified criteria.

A particular version provides a radio base station 100, wherein the criteria corresponds to a predetermined threshold value for a particular signal quantity of the received downlink signal that the UE is ordered to measure.

Another possible embodiment provides a radio base station 100, wherein the radio base station is configured to transmit a measurement ordering message that also comprises instructions ordering the UE to perform measurements on resources according to a particular blanking pattern.

Still another possible embodiment provides a radio base station 100 wherein the radio base station is configured to transmit the measurement ordering message to the UE when triggered by an uplink pilot sequence received from the UE.

In certain optional embodiments may each of the UEs assigned the common uplink pilot sequence be served by a separate radio base station. It is however also possible that the UEs are served by the radio base station 100. This may for example be the case where the base station can control multiple transmission points, e.g. sectors in a three sector site each of which is a cell.

The proposed technology also provides a particular embodiment of a radio base station 100, wherein the downlink signal comprises a downlink pilot signal such as a Demodulation Reference Signal, DMRS, or a Channel State Information Reference Signal, CSI-RS.

Figure 12:
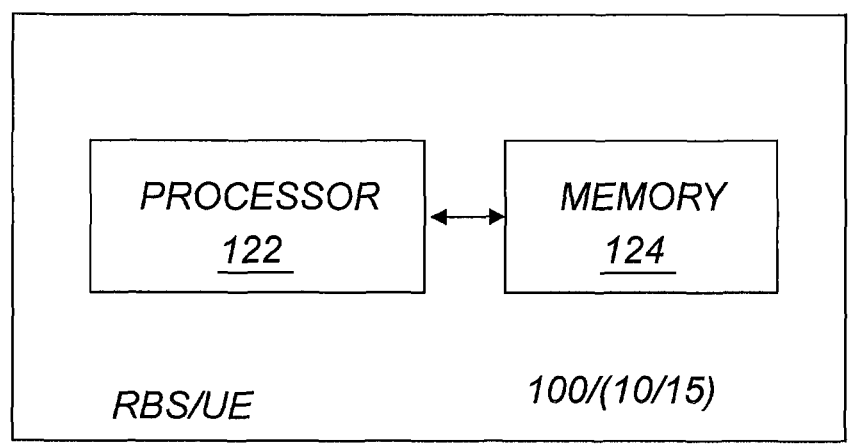
FIG. 12 is a block diagram illustrating a radio base station/UE according to a particular embodiment of the proposed technology.
Figure 13:
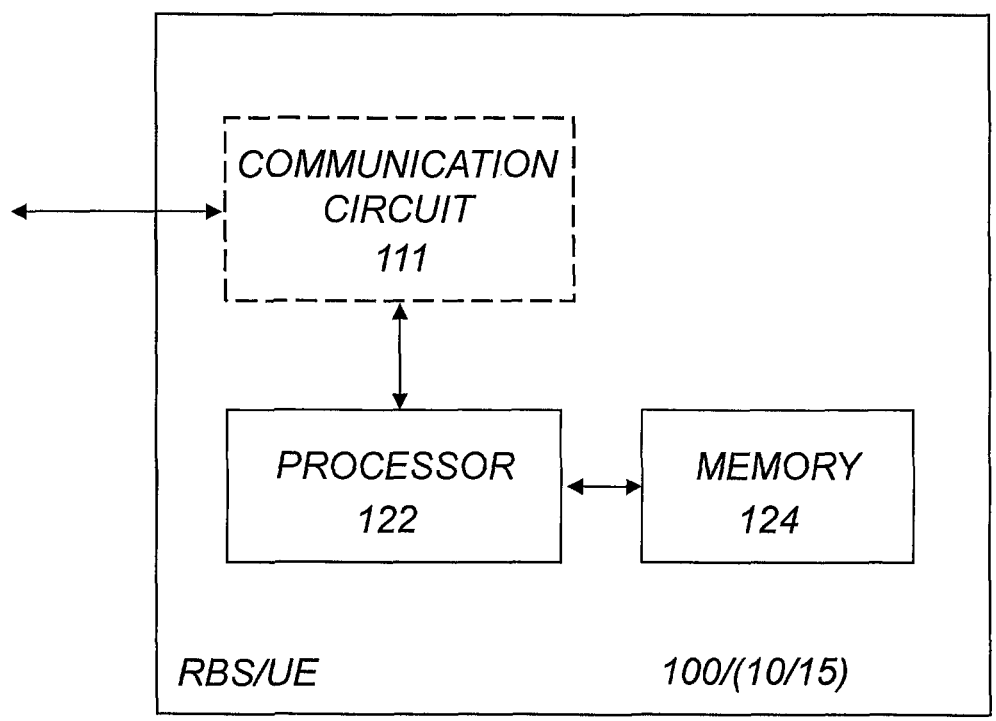
FIG. 13 is a block diagram illustrating another particular embodiment of a radio base station/UE according to the proposed technology.

In a particular example, the network node 100 comprises a processor and a memory, the memory comprising instructions executable by the processor, whereby the apparatus/processor is operative to control radio base stations. FIG. 12 is a schematic block diagram illustrating an example of a radio base station comprising a processor 122 and an associated memory 124. FIG. 13 is an alternative block diagram also illustrating a communication circuitry 111.

The workings of the radio base station may partly be controlled by means of a computer program 135 that comprises instructions, which when executed by at least one processor, cause the processor(s) to:
- read information about a common uplink pilot sequence used by several UEs within the network;
- trigger a transmission of a measurement ordering message to a User Equipment, UE, assigned the common uplink sequence, the measurement ordering message comprising instructions ordering the UE to perform measurements on a downlink signal having a configuration that is based on the uplink pilot sequence assigned to the UE;
- read obtained information relating to the performed measurement;
- process the obtained information in order to determine whether uplink pilot contamination has occurred.

The proposed technology also provides a computer-program product 140 comprising a computer-readable medium having stored thereon the computer program 145.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

Figure 15:
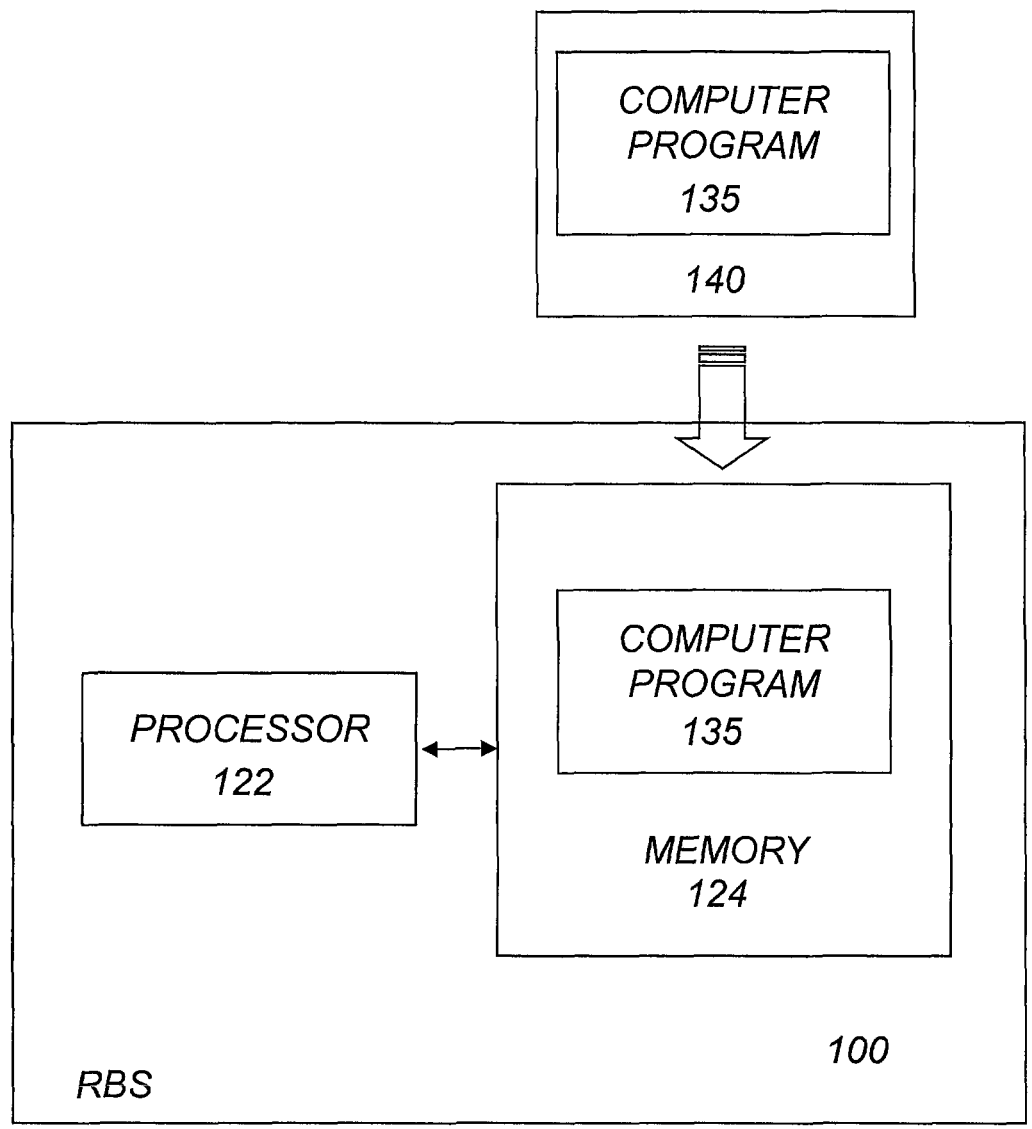
FIG. 15 is a block diagram illustrating a radio base station using a computer program according to the proposed technology.

FIG. 15 illustrates how a computer program 145 is utilized in a particular embodiment of a radio base station 100.

The proposed technology also provides a User Equipment, UE, 10. The UE 10 is configured to receive a measurement ordering message comprising instructions to perform measurements on a downlink signal having a configuration that is based on an uplink pilot sequence assigned to the UE 10. The UE 10 is also configured to perform measurements on the downlink signal. The UE 10 is furthered configured to convey information about the measurements to a radio base station 100 serving the UE to enable the radio base station 100 to determine whether uplink pilot contamination has occurred. The UE 10 is schematically illustrated in the block diagram of FIGS. 12 and 13.

A particular embodiment of the proposed UE provides a UE 10 that is configured to perform measurements on downlink signals that can be identified by information comprised in the measurement ordering message.

A particular version of a UE 10 provides a UE 10 that is configured to perform measurements on specified resources, where information about the specified resources is provided by the measurement ordering message.

Another possible embodiment provides a UE 10 that is configured to perform measurements on downlink signals that are derived from the uplink pilot sequence assigned to the UE 10.

An optional embodiment of the proposed UE provides a UE 10 that is configured to perform measurements on downlink signals if an uplink pilot sequence has been transmitted to the radio base station 100 serving the UE 10.

Still another embodiment of the proposed technology provides a UE 10 wherein the UE 10 is configured to perform measurements on time and/or frequency resources derived from the time when the uplink pilot sequence was transmitted to the radio base station 100 and/or the frequency used when transmitting the uplink pilot sequence to the radio base station 100.

By way of example, the proposed technology provides an embodiment where the UE 10 is configured to convey the information about the outcome of the measurements to the base station 100 if the result of the measurement fulfills a predetermined criteria. The predetermined criteria may refer to a single criterion or to a combination of such single criterions.

A particular version of a UE discloses a UE 10 wherein a criterion comprises a threshold value and wherein the information is conveyed to the radio base station based on the outcome of a comparison between the threshold value and a measured signal quantity.

A particular embodiment of the proposed technology provides a UE 10 wherein the measured signal quantity comprises the received signal power of the measured downlink signal.

A possible embodiment discloses a UE 10 wherein the criteria corresponds to detecting a downlink signal in a resource that is subject to a blanking pattern.

One possible example of such blanking patterns are given by Channel State Information-Interference Measurements, CSI-IM as used in an LTE network.

According to a particular embodiment of the proposed technology there is provided a UE, where the downlink signal comprises a downlink pilot signal such as a Demodulation Reference Signal, DMRS, or a Channel State Information Reference Signal, CSI-RS.

In a particular example, the UE comprises a processor and a memory, the memory comprising instructions executable by the processor, thereby controlling the UE. FIG. 12 is a schematic block diagram illustrating an example of a UE comprising a processor 122 and an associated memory 124. FIG. 13 provides an alternative UE 10 that also comprises a communication circuit 111.

The workings of the UE may partly be prosecuted by means of a computer program 145 that comprises instructions, which when executed by at least one processor, cause the processor(s) to:
- read information in a measurement ordering message comprising instructions to perform measurements on a downlink signal having a configuration that is based on a uplink pilot sequence;
- trigger measurements to be performed on the downlink signal; and
- output information about the performed measurements to enable the information to be transmitted to a radio base station enable the radio base station to determine whether uplink pilot contamination has occurred.

Figure 16:
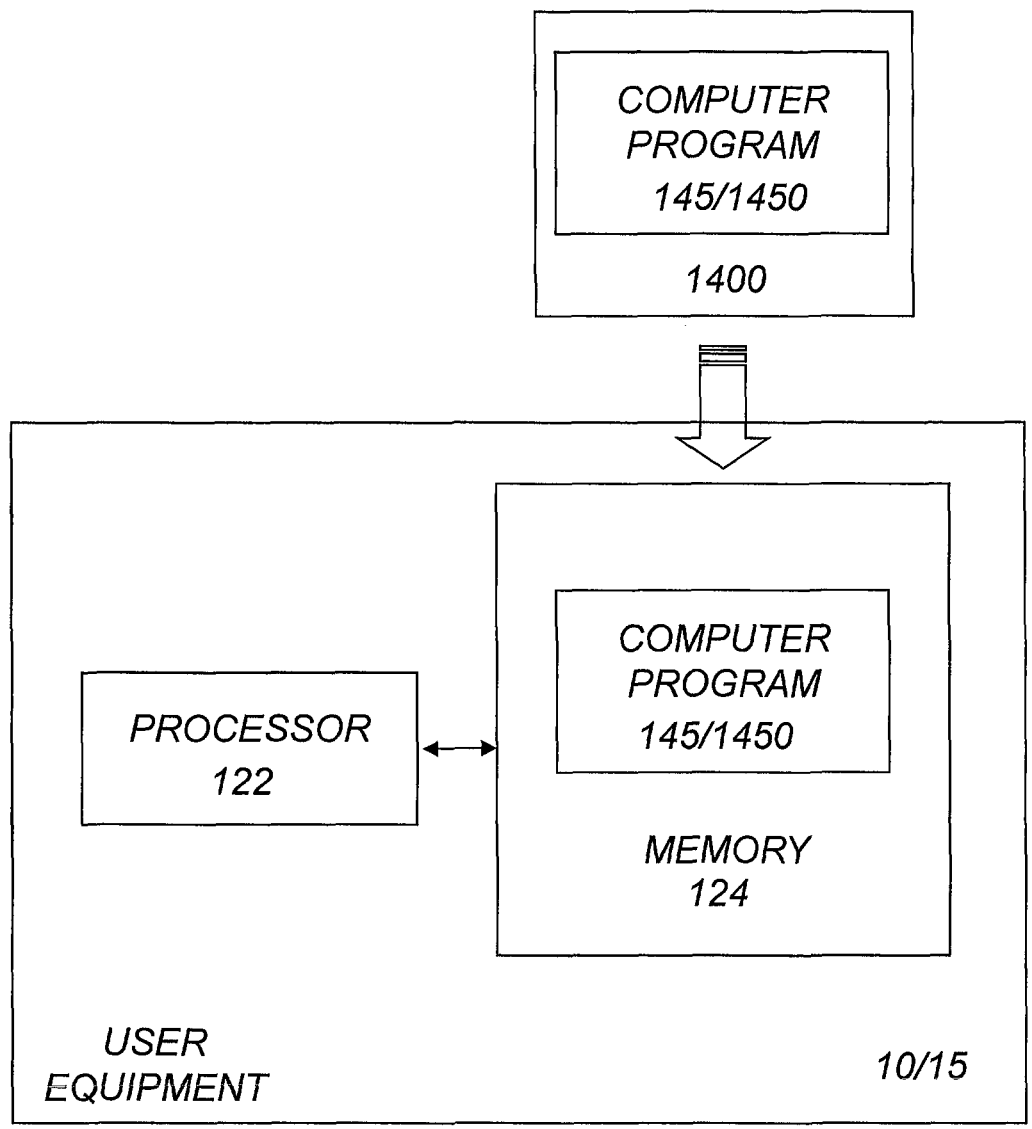
FIG. 16 is a block diagram illustrating a UE using a computer program according to the proposed technology.

The proposed technology also provides a computer-program product 1400 comprising a computer-readable medium having stored thereon the computer program 145. FIG. 16 illustrates how a computer program is utilized in a particular embodiment of a UE.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

The proposed technology also provides a User Equipment, UE, 15. The UE 15 is configured to perform measurements on downlink signals. The UE 15 is also configured to determine whether the downlink signals have a signal configuration that has been generated based on an uplink pilot sequence being essentially the same as an uplink pilot sequence assigned to the UE 15. The UE 15 is also configured to convey information about the measurements performed on the downlink signals determined to have the signal configuration to a radio base station 100 serving the UE to enable the radio base station 100 to determine whether uplink pilot contamination has occurred. The UE is schematically illustrated in the block diagram of FIGS. 12 and 13.

An embodiment of the proposed UE provides a UE 15 that is configured to perform measurements on downlink signals if the UE 15 has transmitted an uplink pilot sequence to the radio base station 100 serving the UE 15.

Another possible embodiment provides a UE 15 wherein the UE 15 is configured to perform measurements on time and/or frequency resources derived from the time when the uplink pilot sequence was transmitted to the radio base station 100 and/or the frequency used when transmitting the uplink pilot sequence to the radio base station 100.

Still another embodiment provides a UE 15 that is configured to determine whether the downlink signals have a configuration that has been generated based on an uplink pilot sequence essentially the same as the uplink pilot sequence assigned to the UE by means of checking whether the downlink sequence can be derived from the uplink pilot sequence assigned to the UE 15.

Yet another embodiment provides a UE 15 that is configured to convey information about the measurements to the radio base station 100 if the result of the measurement fulfills a predetermined criterion.

In a particular example, the UE 15 comprises a processor 122 and a memory 124, the memory comprising instructions executable by the processor, thereby controlling the UE. FIG. 12 is a schematic block diagram illustrating an example of a UE 15 comprising a processor and an associated memory. FIG. 13 provides an alternative block diagram of a UE 15 illustrating also a communication circuitry 111.

The workings of the UE may partly be controlled by computer program 1450 that comprises instructions, which when executed by at least one processor, cause the processor(s) to:

trigger measurements to be performed on a downlink signal;

read the output from the performed measurements;

process the output of the performed measurements in order to determine whether the downlink signal have a signal configuration generated based on a specific uplink pilot sequence;

output information about the measurements performed on the downlink signals that have been determined to have the signal configuration to enable the information to be conveyed to a radio base station to thereby enable the radio base station to determine whether uplink pilot contamination has occurred.

The proposed technology also provides a computer-program product 1450 comprising a computer-readable medium having stored thereon the computer program 1400. FIG. 16 illustrates how a computer program is utilized in a particular embodiment of a UE 15.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

The proposed technology also provides a network node 150 that is configured to assign an uplink pilot sequence to a UE 10, 15 in a wireless communication network. The network node 150 is configured to obtain information about measurements performed by the UE 10, 15 on downlink signals that are based on an uplink pilot sequence essentially the same as the uplink pilot sequence assigned to the UE 10, 15. The network node 150 is also configured to determine, based on the obtained information, whether uplink pilot contamination has occurred. The network node is further configured to assign a new uplink pilot sequence to the UE 10, 15 if it is determined that uplink pilot contamination has occurred. The network node with a processor 12, a memory 13 and a communication circuit 11 is schematically illustrated in the block diagram of FIG. 11.

The network node may be a radio base station serving the UE but it could also be another network node such as the network node referred to as an SRS-entity in the description.

In a particular example, the network node 150 comprises a processor and a memory, the memory comprising instructions executable by the processor, whereby the processor is operative to assign an uplink pilot sequence to a UE 10, 15. FIG. 11 is a schematic block diagram illustrating an example of a network node 150 comprising a processor 12 and an associated memory 12 and an optional communication circuit 11.

The workings of the network node may also be partially performed by means of a computer program 1350. A particular embodiment provides a computer program that comprises instructions, which when executed by at least one processor, cause the processor(s) to:

read information about measurements performed by a User Equipment, UE, on downlink signals that are based on an uplink pilot sequence essentially the same as the uplink pilot sequence assigned to the UE;

determine, based on the obtained information, whether uplink pilot contamination has occurred;

assign a new uplink pilot sequence to the UE if it is determined that uplink pilot contamination has occurred.

The proposed technology also provides a computer-program product 14 comprising a computer-readable medium having stored thereon the computer program 1450. FIG. 14 illustrates a particular embodiment of a radio base station using a computer program.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

As used herein, the non-limiting terms "User Equipment" may refer to a mobile phone, a cellular phone, a Personal Digital Assistant, PDA, equipped with radio communication capabilities, a smart phone, a laptop or Personal Computer, PC, equipped with an internal or external mobile broadband modem, a tablet PC with radio communication capabilities, a target device, a device to device UE, a machine type UE or UE capable of machine to machine communication, iPAD, customer premises equipment, CPE, laptop embedded equipment, LEE, laptop mounted equipment, LME, USB dongle, a portable electronic radio communication device, a sensor device equipped with radio communication capabilities or the like. In particular, the term "UE" should be interpreted as non-limiting terms comprising any type of wireless device communicating with a radio network node in a cellular or mobile communication system or any device equipped with radio circuitry for wireless communication according to any relevant standard for communication within a cellular or mobile communication system.

As used herein, the non-limiting term "network node" may refer to base stations, network control nodes such as network controllers, radio network controllers, base station controllers, and the like. In particular, the term "base station" may encompass different types of radio base stations including standardized base stations such as Node Bs, or evolved Node Bs, eNBs, and also macro/micro/pico radio base stations, home base stations, also known as femto base stations, relay nodes, repeaters, radio access points, base transceiver stations, BTSs, and even radio control nodes controlling one or more Remote Radio Units, RRUs, or the like.

Optionally, the proposed UE, the proposed radio base station and the proposed network node may also include communication circuitry. The communication circuitry may include functions for wired and/or wireless communication with other devices and/or network nodes in the network. In a particular example, the wireless device, UE, network node may include radio circuitry for communication with one or more other nodes, including transmitting and/or receiving information. The communication circuitry may be interconnected to the processor and/or memory.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

In this particular example, at least some of the steps, functions, procedures, modules and/or blocks described herein are implemented in a computer program, which is loaded into the memory for execution by processing circuitry including one or more processors. The processor(s) and memory are interconnected to each other to enable normal software execution. An optional input/output device may also be interconnected to the processor(s) and/or the memory to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps, functions, procedure and/or blocks, but may also execute other tasks.

By way of example, the software or computer program may be realized as a computer program product, which is normally carried or stored on a computer-readable medium, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The flow diagram or diagrams presented herein may therefore be regarded as a computer flow diagram or diagrams, when performed by one or more processors. A corresponding UE, radio base station and network node may be defined as a group of function modules, where each step performed by the processor corresponds to a function module. In this case, the function modules are implemented as a computer program running on the processor. Hence, the UE, the radio base station and the network node may alternatively be defined as a group of function modules, where the function modules are implemented as a computer program running on at least one processor.

The computer program residing in memory may thus be organized as appropriate function modules configured to perform, when executed by the processor, at least part of the steps and/or tasks described herein. An example of such function modules is illustrated in FIG. 17.

Figure 17:
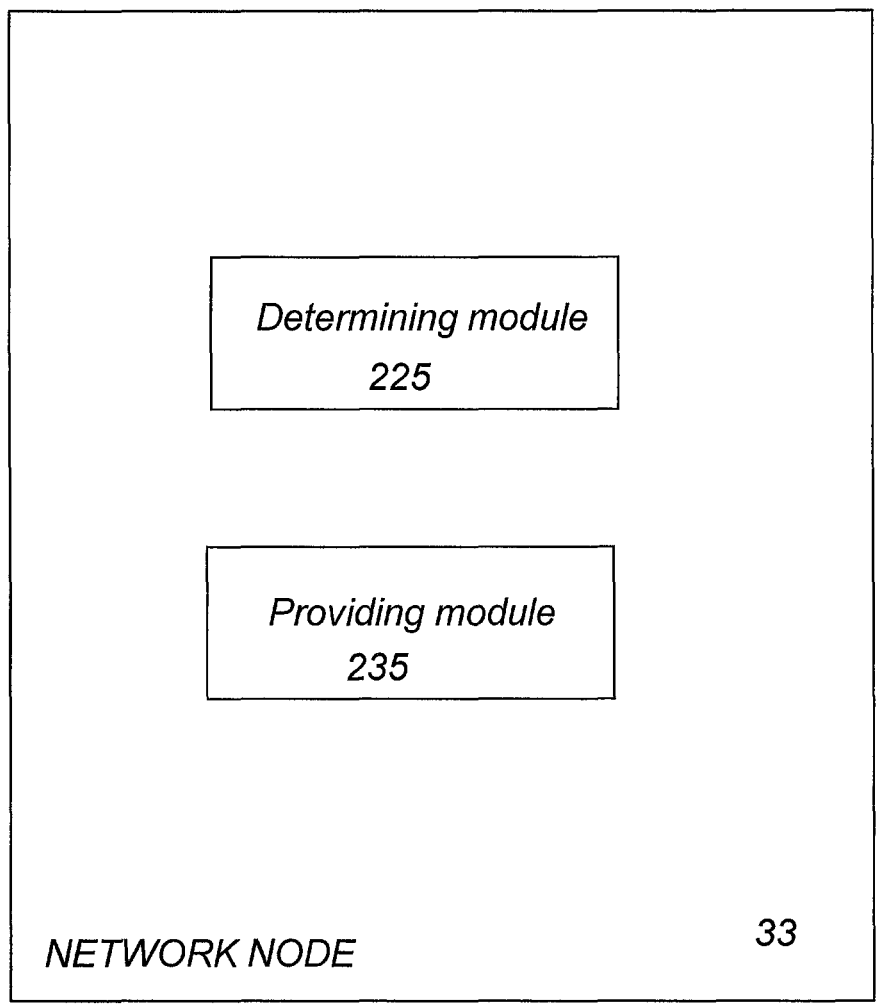
FIG. 17 is a diagram illustrating a particular embodiment of a network node according to the proposed technology.

FIG. 17 is a schematic block diagram illustrating an example of a network node 33 comprising a group of function modules. It is specifically shown a network node 33 configured to control radio base stations 100, 200 in a wireless communication network. The network node comprises a determining module 225 for determining a common uplink pilot sequence to be used by different User Equipment's, UEs, 10, 20 within the wireless communication network, each of the UEs 10,20 being served by a separate radio base station. The network node also comprises a providing module 235 for providing information about the determined common uplink pilot sequence to at least a subset of the radio base stations in the wireless communication network in order to enable each radio base station in the subset of radio base stations to order a UE served by the radio base station to perform measurements on a downlink signal having a configuration that is based on the common uplink pilot sequence.

Figure 18:
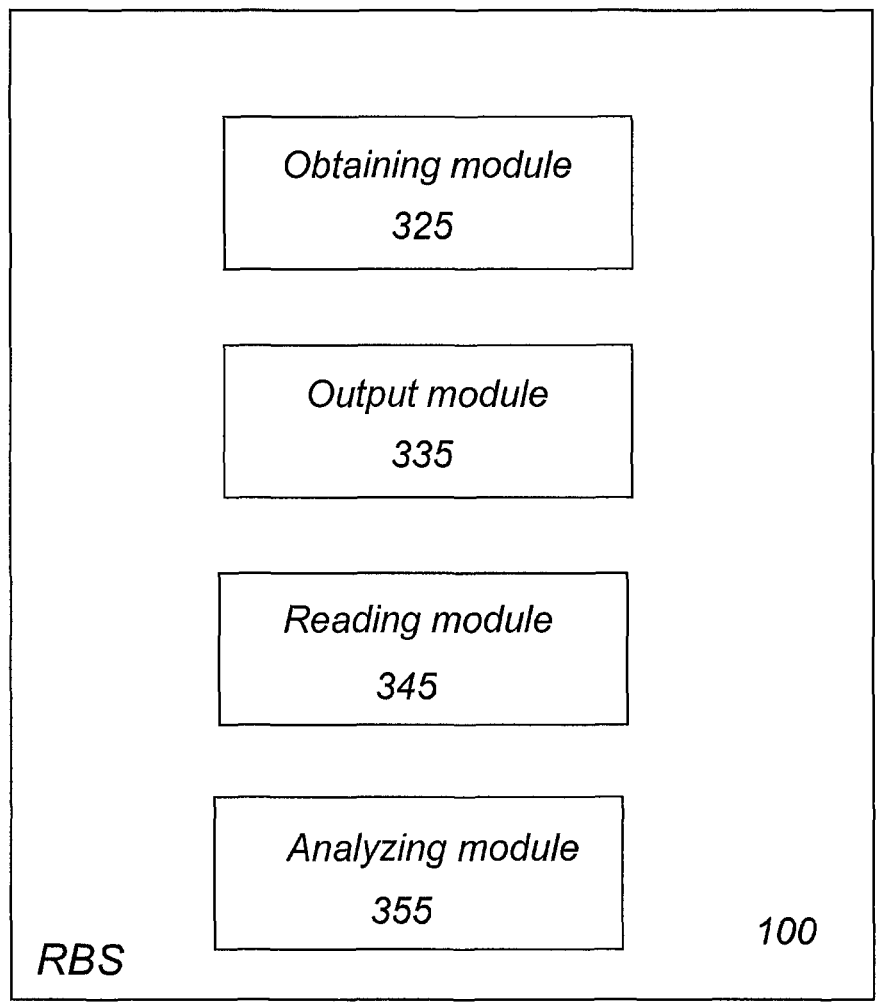
FIG. 18 is a diagram illustrating a particular embodiment of a radio base station according to the proposed technology.

FIG. 18 is a schematic block diagram illustrating an example of a radio base station 100 comprising a group of function modules. It is specifically shown a radio base station 100 in a wireless communication network, wherein the radio base station 100 comprises:

an obtaining module 325 for obtaining information about a common uplink pilot sequence used by several UEs within the network;

an output module 335 for outputting a measurement ordering message to be transmitted to a User Equipment, UE, served by the radio base station (100) and assigned the common uplink sequence, the measurement ordering message comprising instructions ordering the UE to perform measurements on a downlink signal having a configuration that is based on the uplink pilot sequence assigned to the UE;

a reading module 345 for reading obtained information relating to the performed measurement, an analyzing module 355 for analyzing the obtained information to determine whether uplink pilot contamination has occurred.

Figure 19:
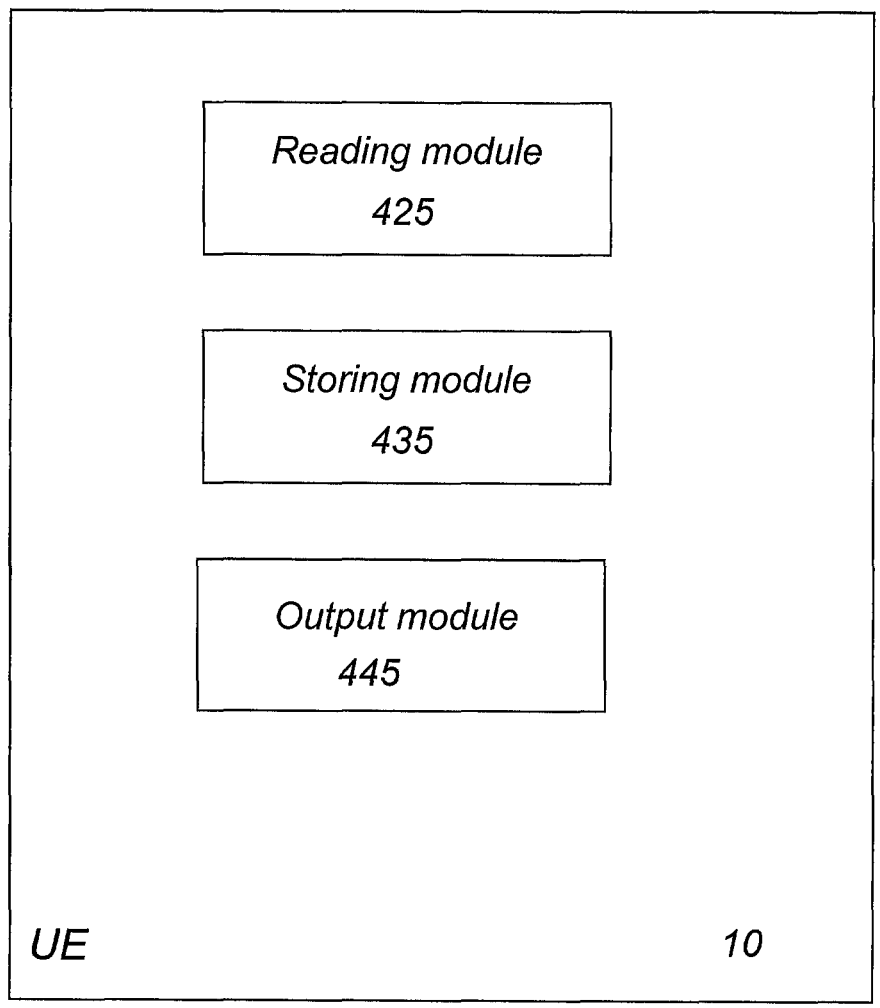
FIG. 19 is a diagram illustrating a particular embodiment of a UE according to the proposed technology.

FIG. 19 is a schematic block diagram illustrating an example of a User Equipment, UE, comprising a group of function modules. It is specifically shown a User Equipment, UE, 10 that comprises:

a reading module 425 for reading a measurement ordering message comprising instructions to perform measurements on a downlink signal having a configuration that is based on an uplink pilot sequence assigned to the UE 10;

a storing module 435 for storing information about measurements performed on the downlink signals;

an output module 445 for outputting information about the measurements to be conveyed to a radio base station 100 serving the UE 10 to enable the radio base station 100 to determine whether uplink pilot contamination has occurred.

Figure 20:
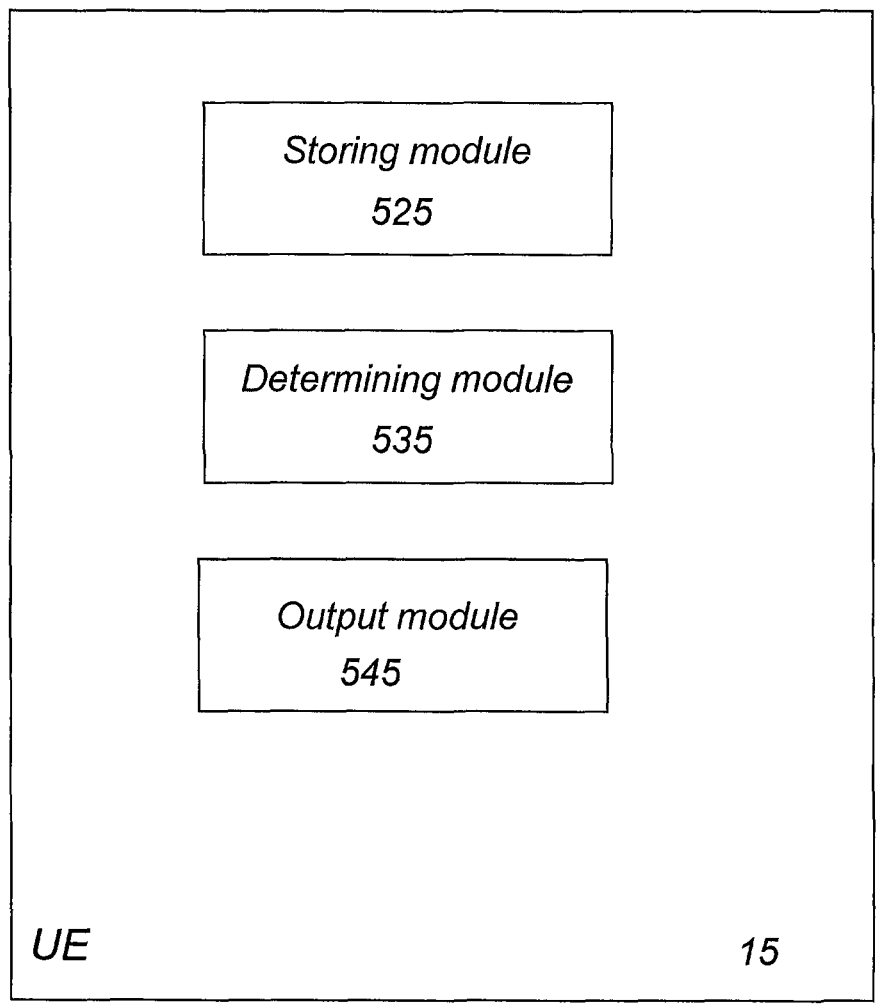
FIG. 20 is a diagram illustrating another particular embodiment of a UE according to the proposed technology.

FIG. 20 is a schematic block diagram illustrating an example of a User Equipment, UE, comprising a group of function modules. It is specifically shown a UE 15 that comprises:

a storing module 525 for storing information about measurements on performed on downlink signals;

a determining module 535 for determining whether the downlink signals have a signal configuration that has been generated based on an uplink pilot sequence being essentially the same as a uplink pilot sequence assigned to the UE;

an output module 545 for outputting information about measurements performed on the downlink signals determined to have the signal configuration to be conveyed to a radio base station serving the UE to enable the radio base station to determine whether uplink pilot contamination has occurred.

Figure 21:
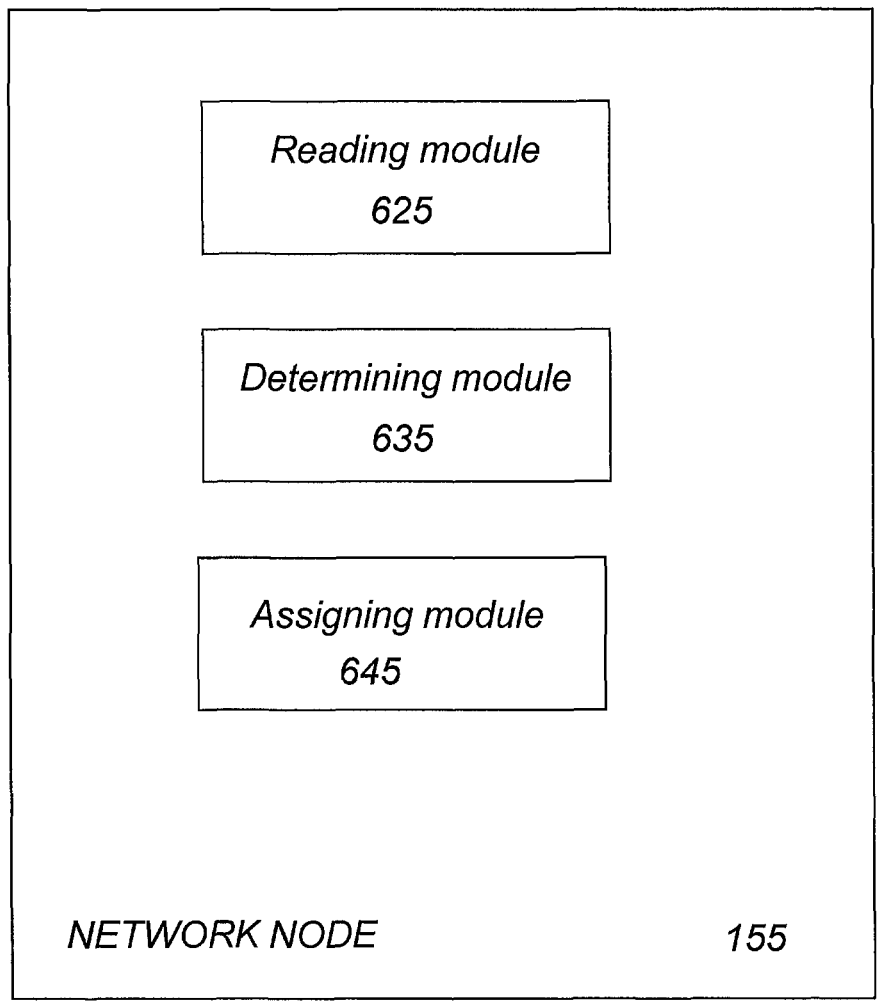
FIG. 21 is a diagram illustrating another particular embodiment of a network node according to the proposed technology.

FIG. 21 is a schematic block diagram illustrating an example of a network node 155 comprising a group of function modules. It is specifically shown a network node 155 that is configured to assign an uplink pilot sequence to a UE 10, 15 in a wireless communication network. The network node 155 comprises:

a reading module 625, for reading information obtained from the UE 10, 15 about measurements performed on downlinks that are based on an uplink pilot sequence essentially the same as the uplink pilot sequence assigned to the UE 10, 15;

a determining module 635, for determining, based on the obtained information, whether uplink pilot contamination has occurred;

an assigning module 645 for assigning a new uplink pilot sequence to the UE 10, 15 if it is determined that uplink pilot contamination has occurred.

Alternatively it is possibly to realize the modules in FIGS. 17-21 predominantly by hardware modules, or alternatively by hardware. The extent of software versus hardware is purely implementation selection.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

The invention claimed is:

1. A method for operating a radio base station in a wireless communication network, the method comprising:
    obtaining information about a common uplink pilot sequence used by a plurality of user equipments (UEs) within the wireless communication network;
    transmitting a measurement ordering message to a User Equipment (UE), of the plurality of UEs, served by the radio base station and assigned the common uplink pilot sequence, the measurement ordering message comprising instructions ordering the UE to perform measurements on a downlink signal having a configuration that is based on the common uplink pilot sequence assigned to the UE, wherein the measurement ordering message further comprises instructions ordering the UE to perform measurements on resources according to a particular blanking pattern, and wherein the resources are determined based on the assigned common uplink pilot sequence;
    obtaining information relating to the performed measurements; and
    analyzing the obtained information relating to the performed measurements to determine whether uplink pilot contamination has occurred, wherein the analyzing the obtained information relating to the performed measurements comprises determining whether the downlink signal was intended for a second UE, different from the UE ordered to perform the measurements.

2. A method for operating a User Equipment (UE), the method comprising:
    receiving a measurement ordering message comprising instructions to perform measurements on downlink signals having configuration that is based on a common uplink pilot sequence assigned to the UE;
    performing the measurements on the downlink signals; and
    conveying information about the measurements to a radio base station serving the UE to enable the radio base station to determine whether uplink pilot contamination has occurred, wherein the information about the measurements is conveyed to the radio base station at least when a downlink signal, of the downlink signals, is detected in a resource that is subject to a blanking pattern.

3. The method according to claim 2, wherein the performing the measurements on the downlink signals is executed when the common uplink pilot sequence has been transmitted to the radio base station serving the UE.

4. The method according to claim 2, wherein the measurements are performed on at least one of time and frequency resources derived from at least one of (i) the time when the common uplink pilot sequence was transmitted to the radio base station and (ii) the frequency used when transmitting the common uplink pilot sequence to the radio base station.

5. A radio base station in a wireless communication network, the radio base station being configured to:
obtain information about a common uplink pilot sequence used by several user equipments (UEs) within the wireless communication network;
transmit a measurement ordering message to a User Equipment (UE), of the several UEs, served by the radio base station and assigned the common uplink pilot sequence, the measurement ordering message comprising instructions ordering the UE to perform measurements on a downlink signal having a configuration that is based on the common uplink pilot sequence assigned to the UE, wherein the measurement ordering message further comprises instructions ordering the UE to perform measurements on resources according to a particular blanking pattern, and wherein the resources are determined based on the assigned common uplink pilot sequence;
obtain information relating to the performed measurements; and
analyze the obtained information relating to the performed measurements to determine whether uplink pilot contamination has occurred, wherein to analyze the obtained information relating to the performed measurements, the radio base station is further configured to determine whether the downlink signal was intended for a second UE, different from the UE ordered to perform the measurements.

6. A User Equipment (UE) configured to:
receive a measurement ordering message comprising instructions to perform measurements on downlink signals having configuration that is based on a common uplink pilot sequence assigned to the UE;
perform the measurements on said downlink signals; and
convey information about the measurements to a radio base station serving the UE to enable the radio base station to determine whether uplink pilot contamination has occurred, wherein the UE is configured to convey the information about the measurements to the radio base station at least when a downlink signal, of the downlink signals, is detected in a resource that is subject to a blanking pattern.

7. The UE according to claim 6, wherein the UE is configured to perform the measurements on the downlink signals when the common uplink pilot sequence has been transmitted to the radio base station serving the UE.

8. The UE according to claim 6, wherein the UE is configured to perform the measurements on at least one of time and frequency resources derived from at least one of (i) the time when the common uplink pilot sequence was transmitted to the radio base station and (ii) the frequency used when transmitting the common uplink pilot sequence to the radio base station.

* * * * *